US012774351B2

(12) United States Patent
Bara et al.

(10) Patent No.: US 12,774,351 B2
(45) Date of Patent: Oct. 27, 2026

(54) METHODS FOR CONVERTING PVC TO ELASTOMERS

(71) Applicant: The Board of Trustees of the University of Alabama, Tuscaloosa, AL (US)

(72) Inventors: Jason Edward Bara, Tuscaloosa, AL (US); Ali A. Alshaikh, Tuscaloosa, AL (US); Paul A. Rupar, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 413 days.

(21) Appl. No.: 18/508,719

(22) Filed: Nov. 14, 2023

(65) Prior Publication Data

US 2024/0084053 A1 Mar. 14, 2024

Related U.S. Application Data

(60) Continuation-in-part of application No. 18/196,776, filed on May 12, 2023, now Pat. No. 12,234,313, which is a division of application No. 17/391,691, filed on Aug. 2, 2021, now Pat. No. 11,685,796.

(60) Provisional application No. 63/060,090, filed on Aug. 2, 2020.

(51) Int. Cl.

| | |
|---|---|
| ***C08F 8/26*** | (2006.01) |
| ***B01J 21/18*** | (2006.01) |
| ***B01J 23/44*** | (2006.01) |
| ***C08F 8/04*** | (2006.01) |
| ***C08F 14/06*** | (2006.01) |

(52) U.S. Cl.

CPC ................. *C08F 8/26* (2013.01); *B01J 21/18* (2013.01); *B01J 23/44* (2013.01); *C08F 8/04* (2013.01); *C08F 14/06* (2013.01)

(58) Field of Classification Search

CPC ............... C08F 8/04; C08F 14/06; C08F 8/26

See application file for complete search history.

(56) References Cited

U.S. PATENT DOCUMENTS

| | | | |
|---|---|---|---|
| 2,716,642 A | 8/1955 | Cotman, Jr. et al. | |
| 3,053,821 A * | 9/1962 | Rees | C08F 8/04 525/338 |
| 3,896,091 A | 7/1975 | Fabris et al. | |
| 4,565,848 A * | 1/1986 | Dussoubs | C08F 8/26 525/331.5 |
| 2007/0083068 A1 | 4/2007 | Ramesh et al. | |
| 2022/0033541 A1* | 2/2022 | Bara | B01J 23/44 |
| 2023/0012030 A1 | 1/2023 | Goulas et al. | |

FOREIGN PATENT DOCUMENTS

| | | |
|---|---|---|
| CN | 101948595 A | 1/2011 |
| JP | H1-0330532 * | 12/1998 |
| JP | 2002128953 A | 5/2002 |

OTHER PUBLICATIONS

Te Nijenhuis, Rheol. Acta 14, 71-84 (1975) (Year: 1975).*

Translation of JPH10330532 (Year: 1998).*

Kise, H., "Dehydrochlorination of poly (vinyl chloride) by aqueous sodium hydroxide solution under two-phase conditions." Journal of Polymer Science: Polymer Chemistry Editon 20.11 (1982) p. 3189-3197.

Yu, J. et al., "Thermal degradation of PVC: A review." Waste Manage. (Oxford, UK) 2016, 48, p. 300-314.

Suresh, S.S. et al., "Synthesis and application of functionalised acrylonitrile-butadiene rubber for enhancing recyclability of poly(vinylchloride) (PVC) and poly(methylmethacrylate) (PMMA) in recycled blends." Clean Technologies and Environmental Policy 20.5 (2018), p. 969-979.

Oh, S.C. et al., "Dehydrochlorination characteristics of waste PVC wires by thermal decomposition." Journal of Industrial and Engineering Chemistry 15.3 (2009), p. 438-441.

Braun, D., "Recycling of PVC." Progress in polymer science 27.10 (2002), p. 2171-2195.

Lu, L. et al., "Degradation of PVC waste into a flexible polymer by chemical modification using DINP moieties." RSC Advances 2019, 9, p. 28870-28875.

Hoydonckx H.E., et al., "Furfural and Derivatives." In Ullmann's Encyclopedia of Industrial Chemistry, (Ed.). doi:10.1002/14356007.a12_119.pub2.

Lin, K.F. et al., "High temperature resins based on allylamine/bismaleimides." Polymer 1996, 37, p. 4729-4737.

Szakacs, T. et al., "Epoxidation of thermally degraded poly (vinyl chloride)." Polymer Degradation and Stability 85 (2004) p. 1035-1039.

Ghaemy, M. et al., "Study of dehydrochlorination of poly(vinyl chloride) in solution and the effect of synthesis conditions on graft copolymerization with styrene." European Polymer Journal 36 (2000) p. 1967-1979.

Skelly, P.W. et al., "Degradation of polyvinyl chloride by sequential dehydrochlorination and olefin metathesis," ChemPlusChem 88 (2023), e202300184.

Non-Final Office Action issued in U.S. Appl. No. 18/196,776, dated Feb. 14, 2024, 11 pages.

Braslau, R.L. et al., "Upcycling waste polyvinyl chloride (PVC) to prepare value-added dienes," University of California Santa Cruz Office of Research, Tech ID: 33223, UC Case 2021-987-0, 2023. https://techtransfer.universityofcalifornia.edu/NCD/33223.html, accessed Jul. 12, 2023.

(Continued)

*Primary Examiner* — Robert C Boyle

(74) *Attorney, Agent, or Firm* — Meunier Carlin & Curfman LLC

(57) ABSTRACT

Disclosed are methods for upcycling polyvinyl chloride (PVC) that involve the dissolving of PVC in an organic solvent; and contacting the PVC with a base, thereby providing a partially dehydrochlorinated PVC. Polymers made by the disclosed, and articles therefore, are also disclosed.

23 Claims, 4 Drawing Sheets

(56) References Cited

OTHER PUBLICATIONS

KMTR Eugene, Oregon, "Turning PVC waste into eco-friendly adhesive: OSU researchers find innovative solution,", https://nbc16.com/newsletter-daily/turning-pvc-waste-into-eco-friendly-adhesive-osu-researchers-find-innovative-solution, dated Jun. 20, 2023.

Wirsen et al., Partially Dehydrochlorinated PVC. I. Structure, Journal of Applied Polymer Science, vol. 22, 3039-3056 (1978).

Perkins et al., Molecular Weight Viscosity Relationships for PVC, Journal of Vinyl Technology, Mar. 1990, vol. 12, No. 1, p. 1-6 (1990).

* cited by examiner

METHODS FOR CONVERTING PVC TO ELASTOMERS

CROSS REFERENCE TO RELATED APPLICATIONS

This application is a continuation-in-part of U.S. application Ser. No. 18/196,776, filed May 12, 2023, which is a divisional of U.S. application Ser. No. 17/391,691, filed Aug. 2, 2021, which claims the benefit of priority to U.S. Provisional Application No. 63/060,090, filed Aug. 2, 2020, which are each incorporated by reference herein in their entireties.

BACKGROUND

Polyvinyl chloride (PVC) is the $3^{rd}$-most widely produced synthetic polymer worldwide, following only polyethylene (PE) and polypropylene (PP). PVC is used in a wide variety of disposable products such as food packaging, beverage bottles, and textiles as well as in long-life products such as pipes, window frames, cable insulation, and roofing materials. This means that the amount of PVC waste will increase over time as the long-life products are eventually disposed. Landfilling or incineration of PVC is generally unfavorable due to the formation and release of chlorine-containing compounds (e.g., HCl and organics). Mechanical recycling of PVC (and thermoplastics in general) typically results in "downcycling" as the process is sensitive to impurities, truncates polymer MW, and yields a product with inferior properties compared to the virgin material.

PVC waste is highly desirable for upcycling applications as its propensity to undergo reactions that makes it undesirable for landfilling are actually advantageous when performed in a controlled manner Under appropriate conditions, PVC can be upcycled into diverse useful and valuable polymer materials through controlled partial dehydrochlorination followed by subsequent functionalization and/or crosslinking. Here, the targeted products are a useful elastomers (rubber) that are chemically akin to poly(chloroprene) (trade name Neoprene), a well-known thermally and electrically insulating waterproof rubber barrier, or chlorinated polyethylene (CPE). The similarities between the structures of PVC, poly(chloroprene), CPE, PVC which has been partially dehydrochlorinated (DHPVC), and PVC which has been partially dehydrochlorinated and hydrogenated ($H_2$-DHPVC) are as follows (where n and m are integers defining the number of repeating units, which depending on the molecular weight of the polymer can vary from 2,000 to 100,000 Da or more).

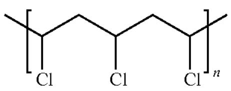

PVC

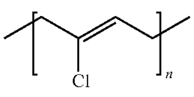

poly(chloroprene)

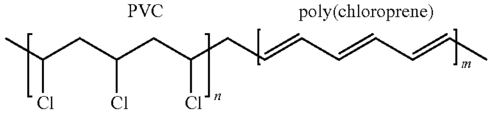

DHPVC

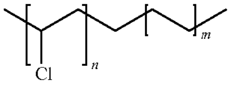

CPE

-continued

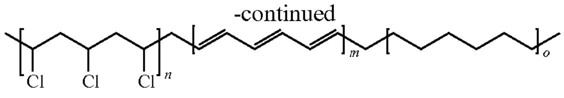

$H_2$-DHPVC where n, m, and o are integers from 1 to $1\times10^6$.

Unlike PE and PP, PVC is "activated" and is more readily susceptible to reaction, especially in the presence of acid or base. The chlorine atoms on the PVC backbone are labile, leaving PVC prone to dehydrochlorination, an elimination reaction that forms $-(HC{=}CH)_n-$ "polyene" segments. Partial dehydrochlorination of PVC can be used as a means of altering PVC properties, but if performed under uncontrolled conditions, spontaneous crosslinking and/or complete degradation can occur. The typical degradation products include aromatic compounds (formed from cyclization of the polyene segments) and HCl (Yu, J.; et al. Thermal degradation of PVC: A review. *Waste Manage*. (Oxford, U.K.) 2016, 48, 300-314), although these products are of low value and can be obtained more readily by other means. However, the activated nature of PVC can be advantageous if used in a controlled manner as it yields unique opportunities to create value-added products from an end-of-life-product that would otherwise be disposed of.

What are needed are new ways to upcycle PVC, converting it into useful polymers and oligomers. New products from these upcycling methods are also desirable. The methods and compositions disclosed herein address these and other needs.

SUMMARY

In accordance with the purposes of the disclosed materials, compounds, compositions, articles, devices, and methods, as embodied and broadly described herein, the disclosed subject matter relates to compositions and methods of making and using the compositions. In other aspects, the disclosed subject matter relates to methods for upcycling polyvinyl chloride (PVC). In specific aspects, disclosed are methods of partially dehydrochlorinating PVC that comprise contacting the PVC with a first organic solvent to form a PVC extract comprising dissolved PVC and the first organic solvent; and contacting the PVC with a second organic solvent and a base, thereby providing a partially dehydrochlorinated PVC. In some aspects, at least a portion of the first organic solvent is removed from the PVC before contacting the PVC with the second organic solvent and base. Further, disclosed are methods whereby the partially dehydrochlorinated PVC are partially hydrofunctionalized by contacting the partially dehydrochlorinated PVC with a hydrofunctionalization catalyst and a hydrofunctionalizing agent, thereby providing a partially hydrofunctionalized, dehydrochlorinated PVC. In yet further aspects, the partially hydrofunctionalized, dehydrochlorinated PVC can again be dehydrochlorinated by dissolving the partially hydrofunctonalized, dehydrochlorinated PVC in a third organic solvent and adding a second base. Still, in further aspects, disclosed are methods whereby the partially hydrofunctionalized, dehydrochlorinated PVC are contacted with a nucleophile substituted diene in the presence of a mild base, to provide a diene substituted partially hydrofunctionalized dehydrochlorinated PVC; and contacting the diene substituted partially hydrofunctionalized dehydrochlorinated PVC with a bis-dienophile. Polymers made by the disclosed methods, and articles of the disclosed polymers are also disclosed.

Additional advantages of the disclosed subject matter will be set forth in part in the description that follows and the Figures, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIG. 3*a* shows the start of the reaction. FIG. 3*b* shows the end of the reaction.

FIG. 5*a* shows spectra of starting dehydrochlorinated PVC (DHPVC) and its hydrogenation product (Hydrogenated DHPVC). FIG. 5*b* shows spectra of starting dehydrochlorinated PVC (DHPVC) and its products of the hydroacylation with nonanal in dichloromethane (DHPVC Hydroacylation DCM) and ethyl acetate (DHPVC Hydroacylation EtOAc).

FIG. 6*a* shows stacked FTIR spectra for DHPVC40 series, for backbone CH 2 bending peaks wavenumbers 1400 $cm^{-1}$ to 1500 $cm^{-1}$. FIG. 6*b* shows stacked FTIR spectra for $DHPVC_{40}$ series, for backbone $CH_2$ stretching peaks, wavenumbers 2750 $cm^{-1}$ to 3040 $cm^{-1}$. FIG. 6*c* shows UV-Vis spectra for DHPVC40 series. FIG. 6*d* shows stacked FTIR spectra for DHPVC60 series, for backbone $CH_2$ bending peaks wavenumbers 1400 $cm^{-1}$ to 1500 $cm^{-1}$. FIG. 6*e* shows stacked FTIR spectra for DHPVC60 series, for backbone $CH_2$ stretching peaks, wavenumbers 2750 $cm^{-1}$ to 3040 $cm^{-1}$. FIG. 6*f* shows UV-Vis spectra for DHPVC60 series. Legend: (—A) PVC Extracts, (—B) DHPVC40-1, (—C) $H_2$-DHPVC40-1, (—D) DHPVC40-2, (—E) $H_2$-DHPVC40-2, (—F) DHPVC40-3, (—G) $H_2$-DHPVC40-3, (—H) DHPVC60-1, (—I) $H_2$-DHPVC60-1, (—J) DHPVC60-2, (—K) $H_2$-DHPVC60-2.

DETAILED DESCRIPTION

Figure 1:
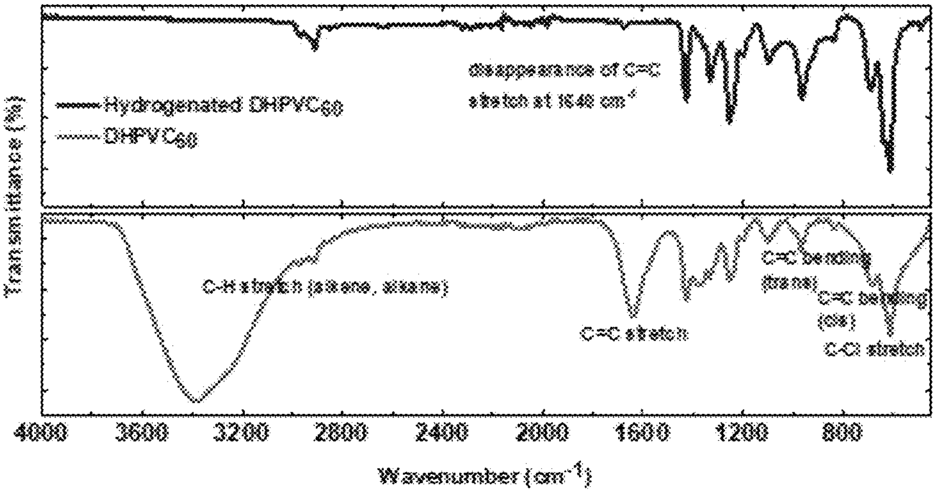
FIG. 1 is a comparison of FT-IR spectra for $DHPVC_{60}$ (top) and $H_2$-$DHPVC_{60}$ illustrating hydrogenation of alkene segments. The large peak at 3300 $cm^{-1}$ in $DHPVC_{60}$ is due to residual water in the sample post-precipitation.

The materials, compounds, compositions, articles, and methods described herein may be understood more readily by reference to the following detailed description of specific aspects of the disclosed subject matter and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —$OZ^1$ where $Z^1$ is alkyl as defined above.

The term "alkenyl" as used herein is a hydrocarbon group of from 2 to 24 carbon atoms with a structural formula containing at least one carbon-carbon double bond. Asymmetric structures such as $(Z^1Z^2)C{=}C(Z^3Z^4)$ are intended to include both the E and Z isomers. This can be presumed in structural formulae herein wherein an asymmetric alkene is present, or it can be explicitly indicated by the bond symbol C═C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" or "CO" is a short hand notation for C═O, which is also referred to herein as a "carbonyl."

The terms "amine" or "amino" as used herein are represented by the formula $—NZ^1Z^2$, where $Z^1$ and $Z^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is $—C(O)NZ^1Z^2$.

The term "carboxylic acid" as used herein is represented by the formula —C(O)OH. A "carboxylate" or "carboxyl" group as used herein is represented by the formula $—C(O)O^-$.

The term "ester" as used herein is represented by the formula $—OC(O)Z^1$ or $—C(O)OZ^1$, where $Z^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^{1O}Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $Z^1C(O)Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" as used herein refers to the fluorine, chlorine, bromine, and iodine.

The term "hydroxyl" as used herein is represented by the formula —OH.

The term "nitro" as used herein is represented by the formula $—NO_2$.

The term "silyl" as used herein is represented by the formula $—SiZ^1Z^2Z^3$, where $Z^1$, $Z^2$, and $Z^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula $—S(O)_2Z^1$, where $Z^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula $—S(O)_2NH—$.

The term "thiol" as used herein is represented by the formula —SH.

The term "thio" as used herein is represented by the formula —S—.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

Methods for Partial Dehydrochlorination of PVC

It is demonstrated herein that controlled partial dehydrochlorination of PVC in THF using a base such as NaOH exclusively promotes elimination of HCl from the PVC backbone, resulting in dehydrochlorinated PVC (DHPVC). A strong red-orange color is observed, indicative of conjugated polyene segments such as those contained in β-carotene and similar natural products. The degree of dehydrochlorination can been monitored by ATR/FT-IR. Substitution reactions (i.e., replacing —Cl with —OH) are not observed under these conditions, likely given the limited solubility of NaOH in THF. DHPVC remains soluble and stable in THF up to at least about 95% dehydrochlorination (forming "$DHPVC_{95}$"), and the DHPVC products are is easily recovered in high yield via precipitation in water.

The disclosed process can start from virgin PVC (i.e., without additives) typically classified by "K-values" (e.g., K-50, K-65, etc.), formulated PVC resins (i.e., containing PVC and one or more additives), commercial PVC products (e.g., "rigid" PVC pipe, pipe fittings, shower liners, cladding, siding) of the form that could be obtained from a concentrated waste management program focused on construction sites. It can also start from consumer PVC (e.g., packaging, containers, tubing). Still further, by "PVC" is also meant related chlorinated plastics such as CPVC, CPE, and PVDC. CPVC is produced by reaction of PVC with $Cl_2$ gas in the presence of free radicals, with additional Cl atoms replacing a portion of the H atoms on the PVC backbone. Whereas PVC can be about 57% Cl by mass, the composition of CPVC is typically about 63-69% Cl by mass, corresponding to ~2 Cl atoms for every 3 C atoms in the polymer backbone. CPVC is used primarily for both cold and hot water piping as it can operate up to 93° C. (200° F.), whereas PVC is limited to 60° C. (140° F.). CPVC can also undergo dehydrochlorination reactions and because of the additional Cl atoms, will present some alkyne functionalities in the backbone which can enable the formation of different value-added small molecule products/product distributions.

CPE is derived from PE in a process similar to that by which CPVC is produced from PVC. The mass of Cl in CPE is typically in the range of 34-44%, meaning there is about 1 Cl atom per 4 C atoms in the CPE backbone, although the distribution/spacing of Cl atoms is random. CPE is often blended with PVC as a softener to improve impact resistance. Thus, CPE may also be present within waste PVC that does not come from pipes and CPE can be depolymerized along with PVC.

PVDC is perhaps best known as the original formulation of Saran Wrap® (aka "cling wrap") a widely-used household food storage product with remarkable barrier properties against water, oxygen, and aromas. PVDC decomposes above 125° C., releasing HCl and forming polyene segments that serve as activated sites for depolymerization of the polymer backbone via ethenolysis or oxidative cleavage.

In the disclosed methods, the PVC can be cut into smaller pieces, e.g., using a saw or shredder, and these fragments can be stirred in warm THF or other organic solvent. Upon dissolution of the PVC and any organic additives, the inorganic additives (primarily $CaCO_3$) remain insoluble and can be readily removed by filtration. This $CaCO_3$ is generally a harmless product that could be safely disposed of or perhaps reused/resold for other applications. Rigid PVC (used for drinking water) is generally free of phthalate plasticizers although it can contain organotin compounds (e.g. dibutyltin dilauarate), which function as stabilizers. These organotin compounds can be hydrolyzed by NaOH and then precipitated from the reaction mixture and can be separated by filtration. This requires a slight excess base (e.g., NaOH) in order to achieve the desired degree of dehydrochlorination, however, the reaction then proceeds in the same manner as for the virgin PVC samples.

Thus, in specific examples disclosed are methods for partially dehydrochlorinating PVC that comprise dissolving the PVC in an organic solvent; and contacting the PVC with a base, thereby providing a partially dehydrochlorinated PVC. Prior to or after contacting the dissolved PVC with base, insoluble inorganic materials can be removed, e.g., by filtration or precipitation.

In other specific examples disclosed are methods for partially dehydrochlorinating PVC that comprise contacting the PVC with a first organic solvent to form a PVC extract comprising dissolved PVC and the first organic solvent; optionally at least partially removing the first organic solvent from the PVC extract (e.g., by evaporation, distillation, or an anti-solvent); and contacting the PVC extract with a second organic solvent and a base, thereby providing a partially dehydrochlorinated PVC. The PVC extract may further include non-dissolved PVC which can be removed before or after contacting the PVC extract with base, e.g., by filtration.

The disclosed method for partially dehydrochlorination of PVC can be carried out at temperatures from about room temperature to about below 350° C. For example, the reaction can be carried out at temperatures from room temperature to about the boiling point of the solvent used at the pressure used. In some aspects, the reaction temperature can be from about 20° C. to 250° C., about 20° C. to 200° C., about 20° C. to 150° C., about 20° C. to 100° C., about 20° C. to about 60° C., from about 60° to about 100° C., or from about 100° C. to about 250° C.

The partially dehydrochlorinated PVC prepared by the disclosed methods can be from about 10% to about 95% dehydrochlorinated PVC, e.g., from about 20% to about 95%, from about 30% to about 95%, from about 40% to about 95%, from about 50% to about 95%, from about 60% to about 95%, from about 70% to about 95%, from about 80 to about 95%, or from about 90 to about 95% dehydrochlorinated PVC. These products can be denoted as $DHPVC_a$, where "a" is the degree of dehydrochlorination. As an example, $DHPVC_{60}$ is about 60% dehydrochlorinated (about 60% of the repeating units are —CH═CH— and about 40% of the repeating units are —CHCl—$CH_2$—. Thus, the disclosed methods can be used to prepare $DHPVC_{50}$, $DHPVC_{55}$, $DHPVC_{60}$, $DHPVC_{65}$, $DHPVC_{70}$, $DHPVC_{75}$, $DHPVC_{80}$, $DHPVC_{85}$, $DHPVC_{90}$, and $DHPVC_{95}$, and any rages of these compounds.

In specific examples, partially dehydrochlorinated PVC prepared by the disclosed methods can have the structure

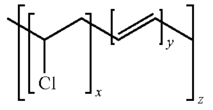

wherein x is from 1 to 1,000,000 (e.g., from 10 to 1,000,000, from 100 to 1,000,000, from 1000 to 1,000,000, from 10,000 to 1,000,000, from 100,000 to 1,000,000), y is from 1 to 1,000,000 (e.g., from 10 to 1,000,000, from 100 to 1,000,000, from 1000 to 1,000,000, from 10,000 to 1,000,000, from 100,000 to 1,000,000), and z is from 2 to 1,000,000 (e.g., from 10 to 1,000,000, from 100 to 1,000,000, from 1000 to 1,000,000, from 10,000 to 1,000,000, from 100,000 to 1,000,000).

The molecular weight of the DHPVC polymers prepared by the disclosed methods can be from about 2,000 daltons to about 10,000,000 daltons, and sometimes from about 5,000 daltons to about 500,000 daltons, and sometimes from about 15,000 daltons to about 200,000 daltons.

Organic Solvent

Successful dehydrochlorination and hydrofunctionalization of PVC requires a highly soluble PVC extract. Exemplary first organic solvents that can be used include, but are not limited to, ethyl acetate, methyl acetate, acetone, and the like, including mixture thereof. Selecting the appropriate first organic solvent or solvent mixture can be done based on the molecular weight (or molecular weight distribution) of the PVC, the size of the PVC particles or pieces, temperature, the presence or absence of inorganic or organic additives and plasticizers, and the like. In specific examples, the first organic solvent can be ethyl acetate or acetone. The first organic solvent can also be heated to facilitate the dissolution of the PVC.

The limited solubility of PVC in most solvents and the properties (e.g., stability to NaOH) of THF make it a suitable solvent for converting PVC to DHPVC. It is also contemplated herein that other organic solvents besides THF can be used, including mixtures of solvents. The second organic solvent should be able to dissolve PVC and generally include polar organic solvents and solvent mixtures thereof. Exemplary second organic solvents that can be used include, but are not limited to, tetrahydrofuran (THF), dichloromethane (DCM), chloroform ($CHCl_3$), acetonitrile, dimethyl sulfoxide (DMSO), pyridine, N-methylpyrrolidine (NMP), dimethylformamide (DMF), dimethylacetamide (DMA), dioxane, dimethylsulfoxide, glycol solvents, methanol, ethanol, propanol, butanol, ethyl acetate (EtOAc), methyl ethyl ketone, acetone, and the like, including mixtures thereof. Selecting the appropriate second organic solvent or solvent mixture can be done based on the molecular weight of the PVC, the size of the PVC particles or pieces, temperature, the presence or absence of inorganic or organic additives and plasticizers, and the like. In specific examples, the second organic solvent can be THF or DMF. The second organic solvent can also be heated to facilitate the dissolution of the PVC. In other examples the second organic solvent can be hexane or methanol, which can be used for heterogenous reactions.

The amount of organic solvent that can be used can vary. Generally, amounts of organic solvent that permit dissolution of the quantity of PVC being treated should be used. Other preferences of the practitioner, e.g., easy of handling, availability, cost, etc., can be a factor in selecting the appropriate amount and type of organic solvent.

Base

The base that can be used in the disclosed methods is generally a strong base. Exemplary bases include, but are not limited to, hydroxides, alkoxides and fluorides of the alkali metals and alkaline earth metals, carbonates, hydrogen-carbonates, phosphates, amides, silazides of the alkali metals, and combinations thereof. Particularly suitable bases include potassium hydroxide, sodium hydroxide, sodium carbonate, potassium carbonate, cesium carbonate, cesium phosphate, silver carbonate, potassium tert-butoxide, sodium tert-butoxide, cesium tert-butoxide, lithium tert-butoxide, potassium phosphate tribasic, potassium phenoxide, sodium phenoxide, a trialkyl amine, isopropoxide, and combinations thereof. In a specific example, the base can be potassium hydroxide or sodium hydroxide.

The amount of base used in the disclosed methods can be up to 1 equivalent per chlorine atom in the PVC backbone. For example, the amount of base can be from about 0.01 equivalent to about 1.5 equivalents, such as from about 0.01 equivalent to about 1 equivalent, from about 0.05 equivalent to about 1 equivalent, from about 0.1 equivalent to about 1 equivalent, from about 0.25 equivalent to about 1 equivalent, from about 0.50 equivalent to about 1 equivalent, from about 0.75 equivalent to about 1 equivalent, from about 0.9 equivalent to about 1 equivalent, or from about 0.99 equivalent to about 1 equivalent, based on the number of chlorine atoms in the backbone.

The amount of dehydrochlorination can be controlled by the amount of base. For example, increasing from about 1% KOH to about 60% KOH per Cl atom shows increasingly darker orange product, due to the increasing numbers of conjugated polyene segments. Thus, in other examples, the amount of base can be from about 1% to about 100% base per Cl atom, e.g., from about 1 to about 90, about 1 to about 80, about 1 to about 70, about 1 to about 60, about 1 to about 50, about 1 to about 40, about 1 to about 30, about 1 to about 20, or about 1 to about 10% per Cl atom.

Non-Solvent

In further examples, the dehydrochlorinated PVC (DHPVC) can be precipitated from the solvent and isolated, e.g., by filtration. A suitable non-solvent is a material in which the organic solvent has high solubility and for which the DHPVC has little or no solubility. In addition, the non-solvent can be chosen such that the impurities (organic and inorganic additives, plasticizers, residual base) have moderate to high solubility. The non-solvent can be a single solvent, e.g., water, methanol, alkanes (e.g., pentane, hexane, and their isomers) or a mixture of solvents, inter alia, methanol/water, ethanol/water, pentane(s)/hexane(s). The relative compositions of solvent mixtures can be adjusted by the formulator depending upon the isolation conditions. In specific examples, the non-solvent can be water, methanol, alkanes, or mixtures thereof.

Methods for Hydrogenation of Partial, Dehydrochlorinated PVC

Furthermore, it is disclosed that the polyene segments in DHPVC can be hydrogenated to form aliphatic hydrocarbon segments (forming $H_2$-DHPVC) using conditions similar to those applied in the food industry for making saturated fats (Scheme 1). This $H_2$-DHPVC can then be further dehydrochlorinated so as to re-introduce additional polyenes. The hydrogenation, dehydrochlorination processes can be repeated to vary or tune the levels of chloro, saturated, and unsaturated residues, providing a means to control the balance and placement of chlorinated segments, polyene segments and aliphatic hydrocarbon segments forming $-(CH_2CHCl)_n-(CH{=}CH-)_m-(CH_2CH_2)_o-$ polymer backbones which are highly tailorable to a variety of elastomer forms.

Scheme 1. Hydrogenation of DHPVC to $H_2$-DHPVC, followed by optional further dehydrochlorination. Indexes n and m can be from 1 to 100,000; indexes p and o can be from 0 to 100,000.

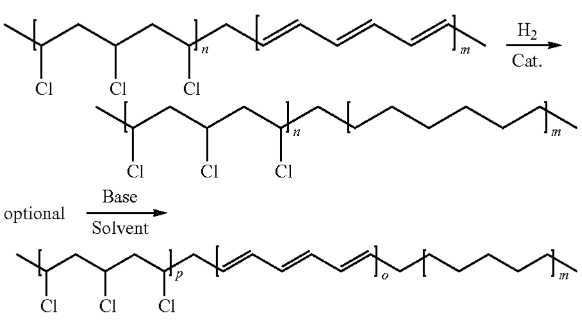

Thus, in specific examples disclosed are methods for partially hydrogenating a partially dehydrochlorinated PVC that comprise dissolving PVC in an organic solvent; contacting the PVC with a base, thereby providing the partially dehydrochlorinated PVC; optionally isolating the partially dehydrochlorinated PVC; partially hydrogenating the partially dehydrochlorinated PVC by contacting the partially dehydrochlorinated PVC with hydrogen in the presence of a hydrogenation catalyst, thereby providing a partially hydrogenated, dehydrochlorinated PVC. The partially hydrogenated, dehydrochlorinated PVC can again be dehydrochlorinated as noted herein, e.g., by dissolving the partially hydrogenated, dehydrochlorinated PVC in a third organic solvent and adding a second base. These second and subsequent dehydrochlorination reactions can be performed as disclosed above using the same or a different organic solvent and base (that is, the third organic solvent and second base can be the same as the original organic solvent and base). As an example of this process, FIG. 1 shows comparisons of FT-IR spectra for $DHPVC_{60}$ and $H_2$-$DHPVC_{60}$ showing conversion of polyene segments to saturated hydrocarbons.

The partially hydrogenated, dehydrochlorinated PVC can be from 50 to 99% hydrogenated, e.g., from about 60% to about 99%, from about 70% to about 99%, from about 80 to about 99%, from about 90 to about 99% hydrogenated, from about 95 to about 99% hydrogenated or from about 98 to about 99% hydrogenated. These products can be denoted as $H_2$-$DHPVC_b$, where "b" is the degree of hydrogenation. As an example, $H_2$-$DHPVC_{60}$ is about 60% hydrogenated (i.e., about 60% of the repeating units are $-CH_2CH_2-$ and about 40% are $-CHCl-CH_2-$ and $-CH{=}CH-$). Thus, the disclosed methods can be used to prepare $H_2$-$DHPVC_{50}$, $H_2$-DHPVC$_{55}$, $H_2$-DHPVC$_{60}$, $H_2$-DHPVC$_{65}$, $H_2$-DHPVC$_{70}$, $H_2$-DHPVC$_{75}$, $H_2$-DHPVC$_{80}$, $H_2$-DHPVC$_{85}$, $H_2$-DHPVC$_{90}$, and $H_2$-DHPVC$_{95}$, and any rages of these compounds.

In specific examples, partially hydrogenated, dehydrochlorinated PVC prepared by the disclosed methods can have the structure

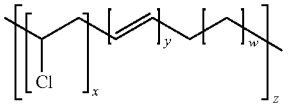

wherein x is from 1 to 1,000,000 (e.g., from 10 to 1,000,000, from 100 to 1,000,000, from 1000 to 1,000,000, from 10,000 to 1,000,000, from 100,000 to 1,000,000), y is from 0 to 1,000,000 (e.g., from 10 to 1,000,000, from 100 to 1,000, 000, from 1000 to 1,000,000, from 10,000 to 1,000,000, from 100,000 to 1,000,000), w is from 1 to 1,000,000 (e.g., from 10 to 1,000,000, from 100 to 1,000,000, from 1000 to 1,000,000, from 10,000 to 1,000,000, from 100,000 to 1,000,000), and z is from 2 to 1,000,000 (e.g., from 10 to 1,000,000, from 100 to 1,000,000, from 1000 to 1,000,000, from 10,000 to 1,000,000, from 100,000 to 1,000,000).

The molecular weight of the $H_2$-DHPVC polymers prepared by the disclosed methods can be from about 2,000 daltons to about 10,000,000 daltons, and sometimes from about 5,000 daltons to about 500,000 daltons, and sometimes from about 15,000 daltons to about 200,000 daltons.

Methods for Hydrofunctionalization of Partial, Dehydrochlorinated PVC

Furthermore, it is disclosed that the polyene segments in DHPVC can be hydrofunctionalized (Scheme 2). The hydrofunctionalization, dehydrochlorination processes can be repeated to vary or tune the levels of chloro, saturated, unsaturated, and hydrofunctionalized residues, providing a means to control the balance and placement of chlorinated segments, polyene segments, aliphatic hydrocarbon segments, and hydrofunctional segments forming $—(CH_2CHCl)_n—(CH{=}CH—)_m—(CH(R^1)CH_2)_o—$ polymer backbones which are highly tailorable to a variety of elastomer forms.

Scheme 2: Hydrofunctionalization of DHPVC. Indexes n and m can be from 1 to 100,000; indexes p and o can be from 0 to 100,000.

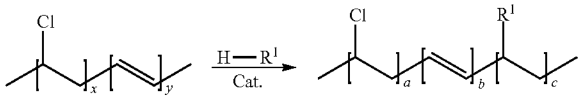

Thus, in specific examples are disclosed for partially hydrofunctionalizing a partially dehydrochlorinated PVC that comprise contacting the PVC with a first organic solvent to form a PVC extract comprising dissolved PVC and the first organic solvent; optionally at least partially removing the first organic solvent from the PVC extract; contacting the PVC extract with a second organic solvent and a base, thereby providing a partially dehydrochlorinated PVC; optionally removing non-dissolved PVC from the PVC extract; optionally isolating the partially dehydrochlorinated PVC; partially hydrofunctionalizing the partially dehydrochlorinated PVC by contacting the partially dehydrochlorinated PVC with a hydrofunctionalization catalyst and a hydrofunctionalizing agent, thereby providing a partially hydrofunctionalized, dehydrochlorinated PVC.

In specific examples, the hydrofunctionalizing agent can be suitable for hydroacylation, hydrosilyation, hydrohalogenation, hydroamination, hydroalkoxylation, and/or hydroformylation. In specific examples, the hydrofunctionalizing agent can be selected from a mixture of $H_2$ and CO gas (e.g., synthesis gas), formaldehyde, a hydrogen-silicon compound (e.g., $H—Si(R^1)_3$, wherein each $R^1$ is independent of the other a H, alkyl, cycloalkyl, cycloheteroalkyl, alkenyl, cycloalkenyl, alkynyl, aryl, or heteroaryl, a hydrogen-halogen compound (e.g., HF, HCl, HBr, HI), a hydrogen-amine compound (e.g., $H—N(R^2)_2$ wherein each $R^1$ is independent of the other a H, alkyl, cycloalkyl, cycloheteroalkyl, alkenyl, cycloalkenyl, alkynyl, aryl, or heteroaryl), a hydrogen-alkoxy compound, wherein the hydrogen and the remaining functional moiety are added across a double bond in the PVC. In specific examples, the hydrofunctionalization, dehydrochlorination process can be repeated with varied hydrofunctional moieties to introduce multiple hydrofunctional groups.

The partially hydrofunctionalized, dehydrochlorinated PVC can again be dehydrochlorinated as noted herein, e.g., by dissolving the partially hydrofunctionalized, dehydrochlorinated PVC in a third organic solvent and adding a second base. These second and subsequent dehydrochlorination reactions can be performed as disclosed above using the same or a different organic solvent and base (that is, the third organic solvent and second base can be the same as the original organic solvent and base).

The partially hydrofunctionalized, dehydrochlorinated PVC can be from about 10% to about 99% hydrofunctionalized, e.g., from about 20% to about 99%, from about 30% to about 99%, from about 40% to about 99%, from about 50% to about 99%, from about 60% to about 99%, from about 70% to about 99%, from about 80 to about 99%, from about 90 to about 99% hydrofunctionalized, from about 95 to about 99% hydrofunctionalized or from about 98 to about 99% hydrofunctionalized.

In specific examples, partially hydrofunctionalized, dehydrochlorinated PVC prepared by the disclosed methods can have the structure

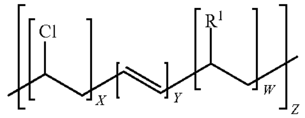

wherein x is from 1 to 1,000,000 (e.g., from 10 to 1,000,000, from 100 to 1,000,000, from 1000 to 1,000, 000, from 10,000 to 1,000,000, from 100,000 to 1,000, 000), y is from 0 to 1,000,000 (e.g., from 10 to 1,000,000, from 100 to 1,000,000, from 1000 to 1,000, 000, from 10,000 to 1,000,000, from 100,000 to 1,000, 000), w is from 1 to 1,000,000 (e.g., from 10 to 1,000,000, from 100 to 1,000,000, from 1000 to 1,000, 000, from 10,000 to 1,000,000, from 100,000 to 1,000, 000), z is from 2 to 1,000,000 (e.g., from 10 to 1,000,000, from 100 to 1,000,000, from 1000 to 1,000, 000, from 10,000 to 1,000,000, from 100,000 to 1,000, 000)z is from 2 to 100,000; $R^1$ is hydrogen, halo, $R^2C({=}O)$, Si, $NR^2R^3$, $OR^2$, or $C({=}O)$; and $R^2$ and $R^3$ are independently selected at each occurrence from hydrogen, $C_{1-6}$ alkyl, $C_{2-6}$ alkenyl, and $C_{2-6}$ alkynyl.

Catalyst

Suitable reagents that can be used for hydrofunctionalizing the dehydrochlorinated PVC include palladium catalyst (e.g., palladium on carbon, palladium (II) acetate, allylpalladium(II) chloride dimer, di-μ-chlorobis[1,2,3-η)-1-phenyl-2-propenyl]dipalladium(II), cyclopentadienyl(allyl)palladium(II), cyclopentadienyl{(1,2,3-n)-1-phenyl-2-propenyl}palladium(II), palladium(II) chloride, palladium (II) pivlate, palladium(0)dba$_2$, palladium(II) acetylacetonate, tetrakis(triphenylphosphine)palladium(0)), Raney nickel catalyst, Raney cobalt catalyst, lithium aluminum hydride, diisobutylaluminum hydride, sodium borohydride, and Wilkinson's Catalyst.

The hydrofunctionalization reaction can be carried out at temperatures from about room temperature to about below 200° C. For example, the reaction can be carried out at temperatures from room temperature to about the boiling point of the solvent used at the pressure used. In some aspects, the reaction temperature can be from about 20° C. to 200° C., about 20° C. to 150° C., about 20° C. to 100° C., about 20° C. to about 60° C., from about 60° to about 100° C., or from about 100° C. to about 200° C.

Additional Modifications

The disclosed process can be used to also create DHPVC and $H_2$-DHPVC polymers that can provide the appropriate backbone structures for upcycling into elastomers with desired properties and performance. DHPVC and $H_2$-DHPVC can be characterized via GPC, FT-IR, NMR, and/or MALDI-TOF MS to confirm the polymer backbone is still intact, and measure changes in molecular weight occurring via changes to functional groups. Also, of interest to the elastomeric properties is the ratio of cis- and trans-linkages that are present in the DHPVC.

Elastomers (commonly called "rubbers") are a class of polymers vital to the modern economy that find use in a broad range of industrial and consumer applications, including o-rings, gaskets, garments, and footwear to name just a few. Elastomers are typically prepared by crosslinking low $T_g$ polymers, such as polyisoprene, polybutadiene, and chloroprene (aka Neoprene™), all of which currently rely on the production of new petroleum-based monomers. Unfortunately, these crosslinks are permanent; this is a fatal barrier to reprocessing and why items such as "vulcanized" car tires cannot be recycled. Using DHPVC, two types of rubbery materials are proposed: a reusable/re-moldable elastomer and a classic thermoset elastomer.

Using $H_2$-DHPVC (e.g., $H_2$-DHPVC$_{90}$), a reusable elastomer can be made from thermally reversible Diels-Alder adducts between furans and maleimides for the crosslinks. Fully recyclable elastomeric materials based on the furan and maleimide has been reported, including examples of polybutadiene and polyisoprene-based rubbers. Furan moieties can be attached to $H_2$-DHPVC$_{90}$ via simple $S_N2$ chemistry between 2-furfuryl mercaptan and the residual vinyl chloride residues of $H_2$-DHPVC$_{90}$ in the presence of a mild base (Scheme 2, top). A small amount of elimination chemistry does occur under these conditions but should be inconsequential. Subsequent combination of the furan containing $H_2$-DHPVC$_{90}$ with a bismaleimides (featuring an alkyl linking chain), at lower temperatures, will form a crosslinked network (Scheme 2, bottom).

Below 60° C., furan/maleimides Diels-Alder adducts are stable. At temperatures between ca. 60-100° C., an equilibrium between adduct formation and dissociation exists. Above 100° C., the equilibrium shifts so that Diels-Alder adduct dissociation dominates. This means, that $H_2$-DHPVC$_{90}$ elastomers crosslinked by furan/bismaleimides are re-moldable and recyclable at temperatures above 100° C.

Scheme 2. Synthesis of a reversibly crosslinked $H_2$-DHPVC$_{90}$ derived elastomer.

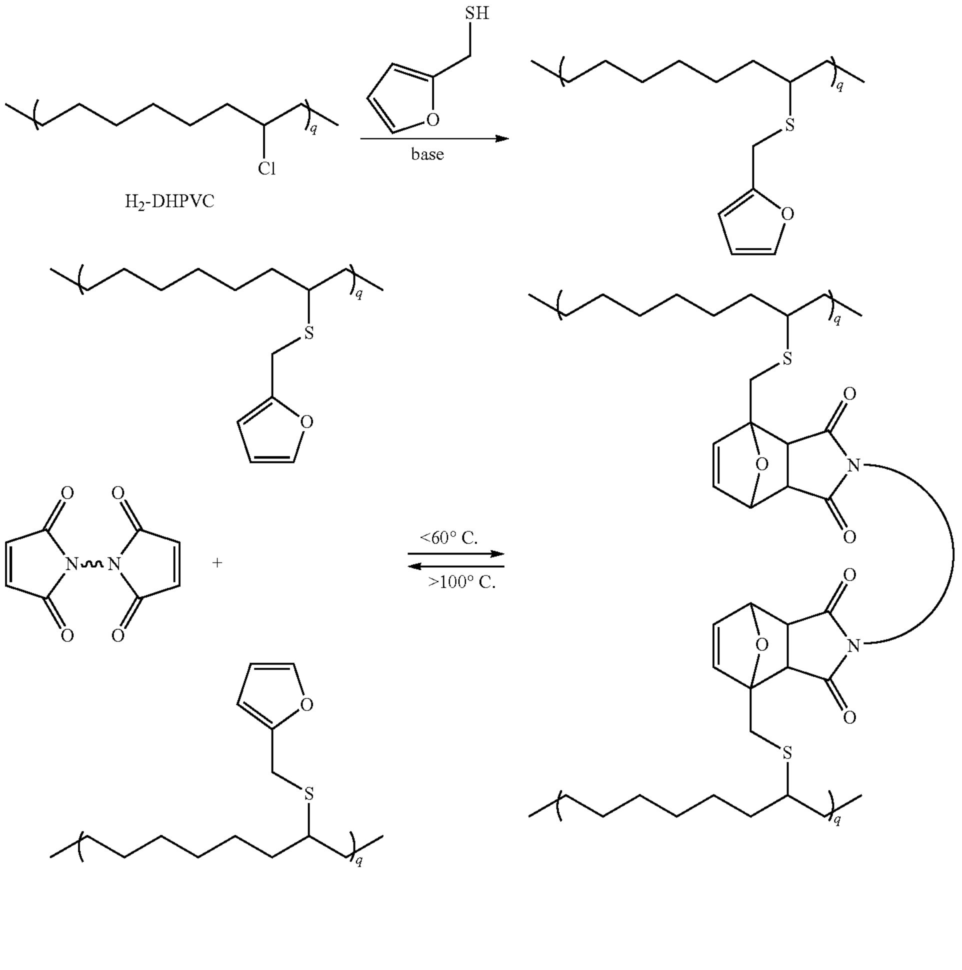

The disclosed synthetic approach to reusable $H_2$-DHPVC$_{90}$ elastomers is tunable. The crosslinking density can be modified by changing furan loadings by using $H_2$-DHPVC with higher chlorine content. Some methods can use simple bismaleimides linked by simple alkyl or aromatic groups, although the chain length and chain morphology can be modified. Changes in the electronics of the furan and maleimides by adding substituents can also be used to alter both the kinetics and thermodynamics of the reversible Diels-Alder reaction, potentially increasing the usable temperature window for crosslinked $H_2$-DHPVC$_{90}$.

Thus, in further examples, disclosed is a method that comprises contacting the partially hydrofunctionalized, dehydrochlorinated PVC, as described herein and as prepared herein, with a nucleophile substituted diene in the presence of a mild base, to provide a diene substituted partially hydrofunctionalized dehydrochlorinated PVC; and then contacting the diene substituted partially hydrofunctionalized dehydrochlorinated PVC with a bis-dienophile.

Suitable examples of a nucleophile substituted diene are furans substituted with alkylthiol groups.

Suitable examples of bis-dienophiles are maleimides or azides linked with a linker of from 2 to 2000 atoms, e.g., an alkyl, polyalkoxyl, aryl linker, siloxane, fluoroalkyl, imidazolium, or ammonium linker. In other examples, the linker can be from 2 to 100 atoms, e.g., from 2 to 50, or from 2 to 20 atoms in length.

Chemical modifications of the polymers can be monitored by NMR and FT-IR spectroscopy. Thermal properties of $H_2$-DHPVC$_{90}$ elastomers can be examined using conventional DSC and TGA. DMA can be used to observe elastic properties over a range of temperatures and time-dependent behaviors (e.g., creep and relaxation). The reusability of the material can be assessed by observing changes in properties of the elastomer over numerous temperature cycles; however, based on prior work on polybutadiene furan/maleimide crosslinked systems, excellent recyclability is expected.

The thermal-reversibility of the furan/maleimide Diels-Alder adduct, will in-part, dictate potential use of $H_2$-DHPVC90 elastomers. Potential applications for recyclable $H_2$-DHPVC elastomers, include 3D printable rubber materials and thermal moldable elastomers. 3D printing of elastomers is currently of great interest to many industries (e.g., automotive, apparel, biomedical, etc.). The disclosed approach affords similar versatility, however by using waste PVC as a feedstock, advantages are realized with low cost starting materials and simple reactions to produce solid materials with tailored properties that can be used in many types of 3-D printers.

Given the structural similarity of $H_2$-DHPVC to polyethylene (and CPE), it will have a similarly low $T_g$ (<−100° C.), which is necessary to create an elastomer. If the $T_g$ of $H_2$-DHPVC needs to be depressed, alkyl chains can be grafted onto PVC by reacting long-chain alkyl thiols with PVC via an $S_N2$ mechanism to lower the $T_g$ of PVC. Plasticization is also likely to occur from the bismaleimides linked by long alkyl chains.

An important feature of $H_2$-DHPVC$_{90}$ elastomers is the low cost and sustainable nature of the chemicals necessary to synthesize it. For example, 2-furfuryl mercaptan is synthesized in 2 steps form furfural and thiourea. Bismaleimides, which are key components of bismaleimide (BMI) resins, are made in one step from malic anhydride and commodity diamines Finally, the quantities of crosslinking agents needed is likely only a few weight % of the final material.

A second DHPVC-based rubber can be formed from DHPVC via classic vulcanization using elemental sulfur or zinc oxides, thiourea, etc. And example is shown below.

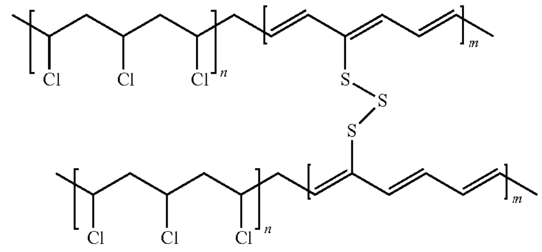

where n and m are as defined herein.

The resulting materials are traditional thermoset elastomers, with tunable properties achieved through balancing the lengths of n and m, as well as crosslink density. While having higher temperature, stability compared to reversibly crosslinked $H_2$-DHPVC$_{90}$, it will not be recyclable. The properties of DHPVC rubber will be like vulcanized Neoprene™, given their structural similarities. If necessary, the $T_g$ of DHPVC can be depressed by grafting branched alkyl chains on to the polymer backbone by $S_N2$ chemistry.

In other examples of modifications, Scheme 3, the DHPVC can be depolymerized by contacting the DHPVC with a metathesis catalyst and a dissolved olefin (added as a gas or liquid). The metathesis catalyst can be a homogeneous or heterogeneous catalyst. The metathesis catalyst can be an organoaluminum or organotin metathesis catalyst. The metathesis catalyst can be a Grubbs catalyst (e.g., any generation, preferably second-generation, or Hoveyda-Grubbs catalyst) or Schrock catalyst. The olefin can be ethylene, or acetylene or propene, 1-butene, 1-pentene, 1-hexane, etc.). In other examples of modifications, the DHPVC can be depolymerized by oxidative cleavage.

Scheme 3. Depolymerization of PVC with activating chemistries to value-added small molecules.

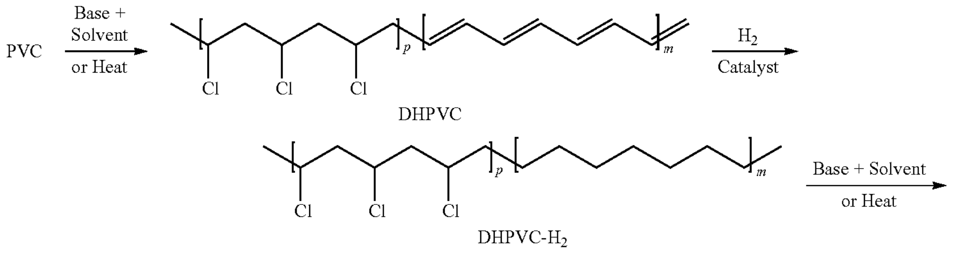

-continued

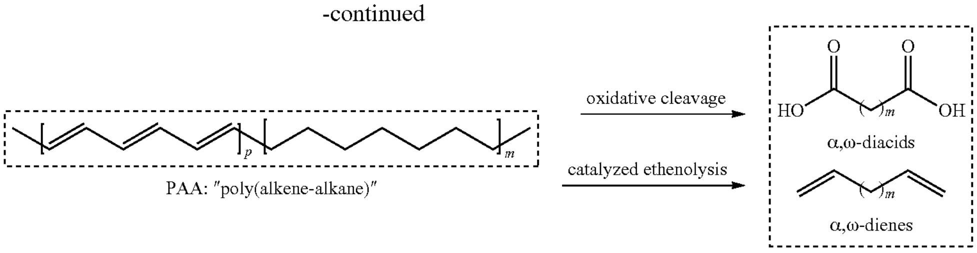

Oxidative cleavage via $KMnO_4/H_3O^+$ or $O_3/H_2O$ generates α,ω-dialdehydes/diols (e.g., 1,4-butanediol, a key precursor to maleic anhydride) as intermediates which can then be further oxidized to α,ω-dicarboxylic acids (i.e., $C_nH_{2(n-1)}O_4$). These diacids can also be easily converted via 1-1±/MeOH to methyl ester forms which will be used for TPE formation. Adipic acid ($C_6H_{10}O_4$) is a primary target, as it has global production of ~2.5 B kg/y, primarily as a monomer for Nylon 6,6. Upcycling PVC waste to Nylon precursors represents a major opportunity, given the premium associated with Nylon, and the long lives of Nylon products, effectively keeping PVC waste from entering the environment. This depolymerization strategy also affords access to other diacids which have important uses in polymers, cleaning agents, lubricants, pharmaceuticals, and cosmetics. These larger diacids are difficult to synthesize and/or are solely derived from plants or microorganisms. One such molecule obtainable from PVC depolymerization is heneicosanedioic acid ($C_{21}H_{40}O_4$) a component of "Japan Wax" cosmetic formulations and currently sourced from trees (*Rhus verniciflua, Rhus succedanea*).

Olefin metathesis generates α,ω-dienes by cleaving PAA via "ethenolysis" using ethylene and an olefin metathesis catalyst (i.e., Grubbs $2^{nd}$ Generation). An important α,ω-diene is 1,3-butadiene, a precursor to synthetic rubber as well as adiponitrile, another key intermediate for Nylon. Other α,ω-dienes (e.g., 1,5-hexadiene, 1,8-nonadiene) find industrial uses as precursors to a variety of chemicals.

An essential aspect of achieving high selectivity for target products along with narrow product distributions is controlling the size and distributions of the PAA structures (i.e., 'p' and 'm' segments in Scheme 3). While the reactions performed are well-defined, achieving the yield and selectivity targets when starting from a polymer feedstock requires a deep understanding of the reaction mechanisms and selection of appropriate strategies. The influence of reaction conditions will be analyzed through systematically designed experiments that elucidate the roles of reaction variables on the formation and types of polyene structures. These parameters include: solvent (e.g., THF, DMSO, toluene, etc.), metal hydroxide (e.g., NaOH, KOH, LiOH, etc.) or other base (e.g., $K_2CO_3$), temperature; solubility of the polymer backbone as it develops more hydrocarbon character in the transition from DHPVC→DHPVC-$H_2$→PAA. Furthermore, given this potential for changes in polymer solubility (which necessitates the use of multiple solvents), it can be advantageous to explore strategies that form DHPVC at levels of only 5-10%, then cleave this DHPVC via ethenolysis (producing 1,3-butadiene) such that subsequent dehydrochlorinations, hydrogenations, and cleavage reactions are performed on oligomeric species that are more soluble in common solvents and thus easily processed into final value-added products.

EXAMPLES

To further illustrate the principles of the present disclosure, the following examples are put forth so as to provide those of ordinary skill in the art with a complete disclosure and description of how the compositions, articles, and methods claimed herein are made and evaluated. They are intended to be purely exemplary of the invention and are not intended to limit the scope of what the inventors regard as their disclosure. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

DHPVC Solubility:

Experiments were conducted to determine the solubility of bulk DHPVC in a number of solvents. The experiments were done for DHPVC with different degrees of dehydrochlorination (40%, 60% and 80%). All experiments were done with the same conditions, 0.5 mg DHPVC per 1 mL of solvent (+/−0.1 mg). Table 1 summarizes the results.

TABLE 1

Solubility of DHPVC in solvents.

| Solvent | Solubility |
|---|---|
| Dimethylformamide (DMF) | Soluble |
| Dichloromethane (DCM) | Soluble |
| Tetrahydrofuran (THF) | Soluble |
| Dimethylacetamide (DMA) | Soluble |
| Chloroform (CHCl3) | Slightly soluble |
| N-methylpyrrolidine (NMP) | Slightly soluble |
| otiDimethylsulfoxide (DMSO) | Slightly soluble |
| Ethyl Acetate (EtOAc) | Insoluble |
| Propylene Glycol (PG) | Insoluble |
| Dihydrolevoglucosenone (Cyrene ™) | Insoluble |

It was noticed that despite the solubility of DHPVC in THF, the solution may "gel" when left stationary or under uneven stirring. This behavior in THF is worse with increasing dehydrochlorination degree.

Initial Dehydrochlorination (Targeted 80% Removal of Cl from PVC):

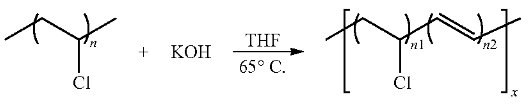

PVC (10 g, 0.160 mol), KOH (7.18 g, 0.128 mol), and THF (~650 mL) were added to 1 L round bottom flask. The vessel was equipped with a stir bar and a reflux condenser. The reaction was heated to 65° C. and stirred at this temperature overnight (18 h).

After this time, the reaction was allowed to cool to room temperature. Then, the contents of the vessel were poured in cold methanol, under high shear using a Heidolph overhead stirrer operating at 450-600 rpm. Higher shear rates help create smaller particles from the precipitate making it easier to dry.

The product was filtered, washed with an excess of methanol three more times, collected, and left to dry under vacuum. The dehydrochlorinated PVC ("DHPVC") product was characterized by FTIR before moving on with the next reaction.

Hydrogenation/Saturation of Polyene Segments:

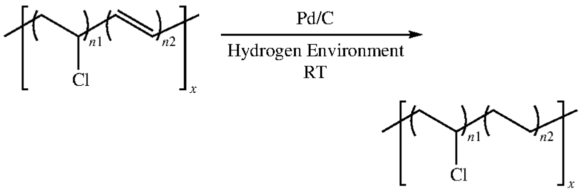

DHPVC (5 g) was added to a heavy walled 250 mL glass pressure vessel. DMF (150 mL), and 10 wt % Pd/C catalyst (0.25 g) were also added to the vessel. The vessel was sealed with a threaded PTFE cap connected to a 3-way valve. Using this valve, the vessel is purged by vacuum and then filled with hydrogen gas at a constant pressure (~45 psia). The reaction was stirred at ambient temperature for 24 hours.

After this time, the Pd/C catalyst was removed via filtration through Celite and disposed of in a safe manner. The filtrate was poured into methanol or water under stirring. The precipitated product was collected by vacuum filtration, then was left to dry on the filter for 24 hours. The "$H_2$-DHPVC" product was characterized by FTIR before moving on with the next reaction.

Second Dehydrochlorination (Optional):

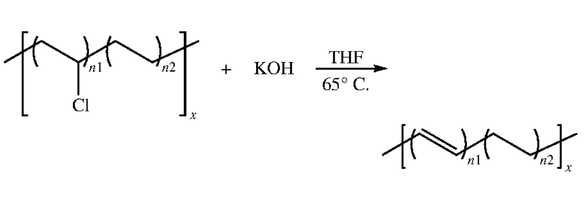

The chlorine content remaining in the DHPVC-$H_2$ product was calculated with the following equation:

$$\text{Mass of } DHPVC-\text{H2(g)}\times\frac{(100-\text{inital percentage of KOH})}{100}\times\frac{1}{62.5}\frac{\text{mol}}{\text{g}} \quad (1)$$

So, $H_2$-DHPVC (2 g), KOH (0.0064 mol, 0.359 g), and 35 mL THF were added to a 50 mL round bottom flask. The process follows the same steps as the first dehydrochlorination.

Heterogenous Dehydrochlorination and Hydrogenation:

Experiments were conducted to test the viability of heterogenous condition for dehydrochlorination and hydrogenation. Dehydrochlorination was done by stirring 5 g of PVC and 1.28 g NaOH in 80 mL hexanes at 60° C. The characteristic discoloration of PVC post-dehydrochlorination was noticed here. This discoloration shows the potential of success for this method.

Heterogenous hydrogenation was attempted in methanol. For this reaction, ~3 g DHPVC was stirred with 0.3 g Pd/C (10 wt %) in methanol. This process proved successful, although yields were low. This is due to the difficulty of separating the catalyst post-hydrogenation.

Depolymerization of DHPVC:

Ethenolysis reactions were conducted to depolymerize DHPVC. This was done by dissolving ~2.5 g DHPVC in 120 mL DCM or THF and stirring it with 0.025 g 2n d generation Grubb's Catalyst (1 wt %) under 30 psi of ethylene gas for ~48 hrs. The reaction media was then immediately poured into methanol to deactivate the catalyst and precipitate the product. The product produced had a dark brown color, which is likely due to the leftover catalyst.

Substitution of Chlorine in PVC/DHPVC

Attempts to substitute chlorine with imidazole compounds (1-methylimidazole specifically) were done. Here, 5 g PVC was dissolved in THF and mixed with 1.28 g NaOH to make a THF/4DHPVC-40solution. The solution was filtered to remove any unreacted base or other solid byproducts. The product was left in solution for the hydrogenation reaction. The hydrogenation was done by stirring the solution with ~0.25 g Pd/C and put under 30 psi hydrogen gas for ~48 hrs. Prior to the substitution reaction, the reaction media was filtered through celite to remove the catalyst producing a clear light-green solution. The solution was then mixed with 2.76 g 1-methylimidazole in 150 mL acetonitrile (ACN) and heated to 80° C. overnight. After the reaction was concluded, ACN and THF were removed by rotation evaporation producing a yellow solid. The solid was stirred in ether to remove any unreacted 1-methylimidazole. Although the reaction showed signs of success, the method still requires more optimization to increase the yield and better the processing stage.

Commercial PVC Trials

Commercial formulated PVC samples was used to produce $H_2$-DHPVC. The goal of this experiment was to determine if PVC products, like piping and packaging, need pre-treatment before going through the process of producing $H_2$-DHPVC. For this, 1.5 g of pipe or packaging PVC was stirred in DMF overnight to allow the solids to dissolve fully. The next day, 1.28 g NaOH was added and left stirring for 24 hrs. The produced solution was filtered through Celite™ to remove unreacted base and additives that crashed out of the solution. The filtrate was then precipitated in methanol, filtered, and dried under reduced pressure overnight. The powder produced (0.5 g) had a light orange color and was sampled for characterization. The remaining product was then dissolved in DMF and mixed with 0.05 g Pd/C (10 wt %) under 30 psi $H_2$ gas for ~48 hrs. The reaction media was then filtered through Celite to remove the catalyst. The solution was then precipitated in methanol, filtered, and dried under reduced pressure producing 0.1 g of an off-white powder.

FTIR spectra show that peaks belonging to potential additives disappearing after dehydrochlorination, giving a product that is generally similar to DHPVC made with virgin PVC (sourced from Sigma-Aldrich).

Hydrofunctionalization of PVC

Shown herein is the capability of DHPVC to be hydrofunctionalized, and hydroacylated. This method allows for the production of highly tailorable modified PVC and "internally-plasticized" PVC, as it has the potential of hydrosilyation, hydroboration, hydroamination, hydroalkoxylation and hydroformylation.

To utilize this method, highly soluble PVC is required. Towards this end, bulk PVC samples was fractionated via extraction (leaching) by ethyl acetate or acetone in which soluble low molecular weight fractions dissolve. The solubility of these fractions in these solvents, and other organic solvents, allowed homogenous catalysis reactions.

PVC extracts are first dehydrochlorinated in basic conditions. This reaction can run in several solvents, however the solvent of choice here was tetrahydrofuran (THF). The reaction is run according to the following:

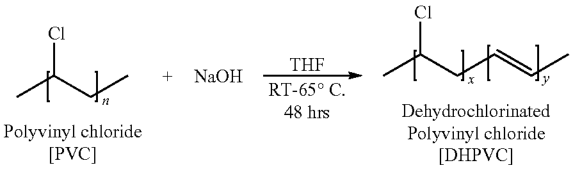

Polyvinyl chloride [PVC]

Dehydrochlorinated Polyvinyl chloride [DHPVC]

Figure 2:
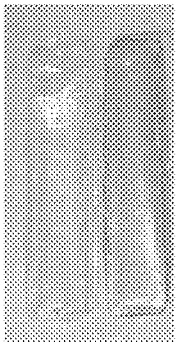
FIG. 2 shows a change in color between the PVC extracts (left), and dehydrochlorinated PVC extracts (right).

Sodium hydroxide (NaOH) is added on molar equivalencies lower than 1.0 to prevent total dechlorination. The dehydrochlorination reaction can work both as a preparatory step and a purification step given the existence of additive in PVC. Once the reaction is concluded, the contents are filtered then precipitated into an anti-solvent such as methanol, which separates the polymer from the soluble side-products, including those caused by any additive. DHPVC is an orange colored polymer (FIG. 2), with a tendency to degrade through oxidation under air. Thus, it is dried under vacuum, and used soon after.

DHPVC keeps its solubility in solvents such as ethyl acetate or dichloromethane due to the partial dehydrochlorination. After dissolving DHPVC in one of these solvents, it undergoes a hydrofunctionalization reaction with $H_2$ gas, or aldehydes (e.g. nonanal) as follows:

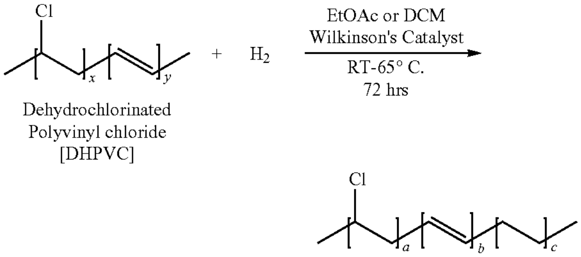

Dehydrochlorinated Polyvinyl chloride [DHPVC]

Hydrogenated Dehydrochlorinated Polyvinyl chloride [$H_2$-DHPVC]

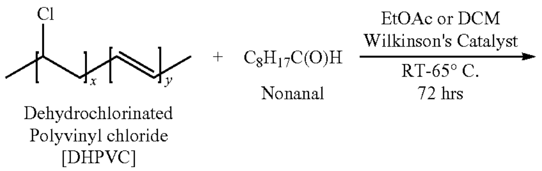

Nonanal

Dehydrochlorinated Polyvinyl chloride [DHPVC]

-continued

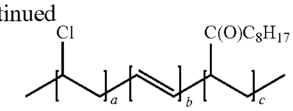

Nonanal-Hydrocylated Dehydrochlorinated Polyvinyl chloride [$H_2$-DHPVC]

Figures 3A, 3B, 3C:
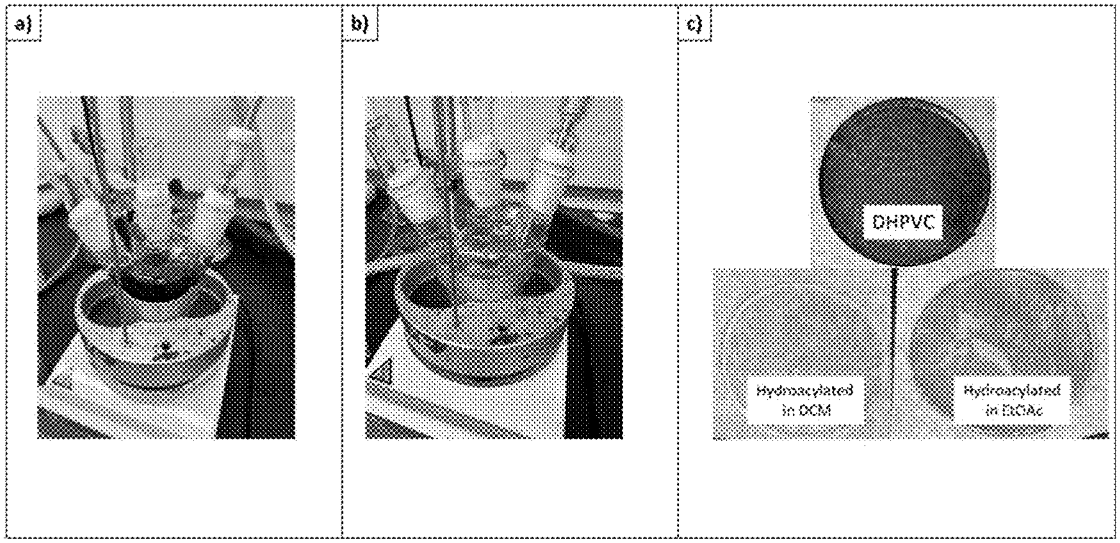
FIGS. 3*a*-3*b* depict a change in color during the hydroacylation reaction in DCM.
FIG. 3*c* shows a change in color of products of the hydroacylation reaction in DCM and EtOAc.

A change in color is observed during the reaction (FIGS. 3*a*-3*b*), which is contributed to the de-conjugation, and thus grafting of hydrogen or nonanal into the double bonds. The products are similarly decolored (FIG. 3*c*).

Figure 4:
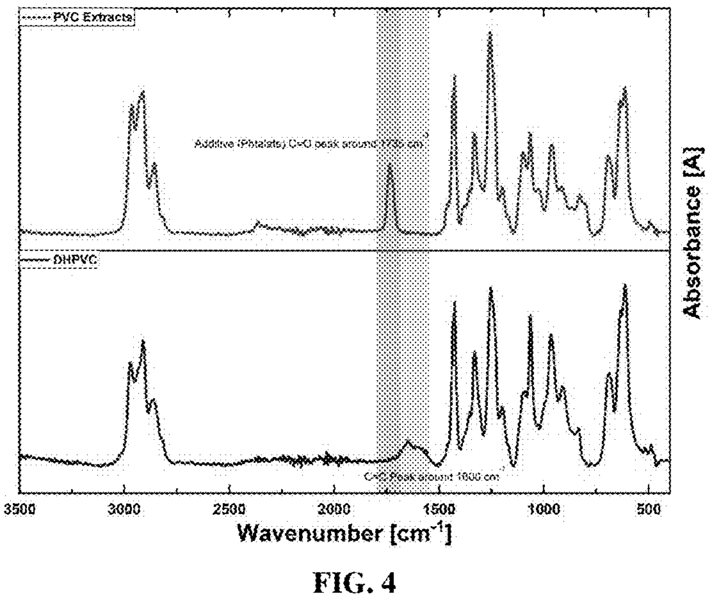
FIG. 4 shows FTIR spectra of the PVC extracts and their dehydrochlorinated products (DHPVC).

The success of reactions is shown using Fourier-transform infrared spectroscopy (FTIR). The formation of double bonds during the dehydrochlorination reaction is evident by the broad conjugated C═C peak around 1600 $cm^{-1}$, accompanied by a disappearance of the phthalate additive C═O peak at 1735 $cm^{-1}$ (FIG. 4).

Figures 5A, 5B:
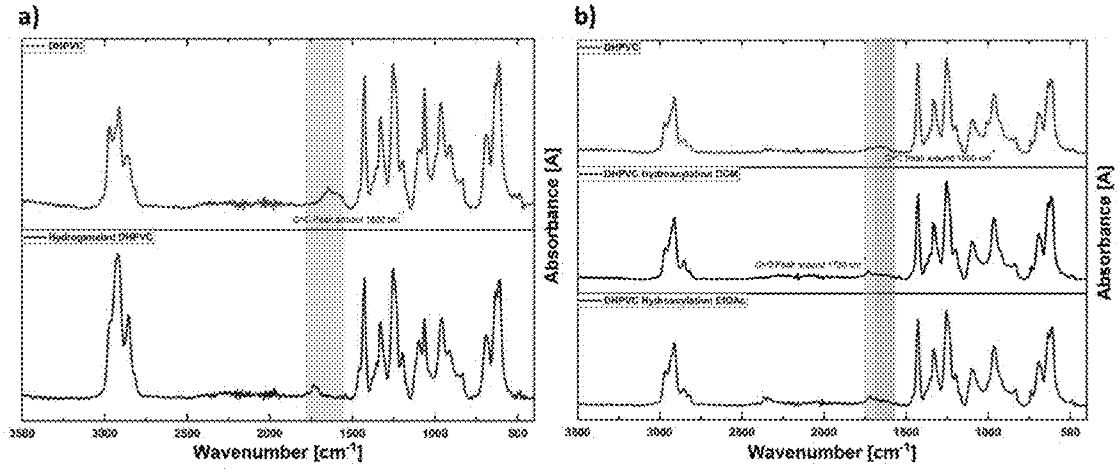
FIGS. 5*a*-5*b* depict FTIR spectra of the hydrofunctionalization reaction starting materials and products.

Following hydrofunctionalization reactions, a reduction of the C═C peak is visible (FIGS. 5*a*-5*b*), alongside a new C═O peak around 1720 $cm^{-1}$ (FIG. 5*b*), which denotes the incorporation of the aldehyde in the case of reaction with nonanal.

The success of these reactions opens the door for modifying PVC in a variety of ways. Hydrogenations of DHPVC produced a product that is molecularly akin to CPE and can be used for many of the same applications. Hydroacylation can introduce ketone side groups into the backbone, thus potentially increasing the solubility of the polymer, alongside acting as an internal plasticizer. Other hydrofunctionalization methods can introduce different properties and features into PVC, thus increasing its value and applicability.

Homogenous Dehydrochlorination and Hydrogenation:

Fractionation of PVC: Commercial samples of formulated PVC pellets containing plasticizer (as received) were soaked in hexanes (~2 L hexane/1 kg PVC pellets) for 24 h. The hexanes phase, which has leached the bulk of the plasticizer from the PVC, was drained from the vessel. PVC was then further washed with an equivalent volume of hexanes once more. EtOAc was then added to the vessel with a volume around 3× that of the PVC pellets. The PVC pellets swelled to about 2×-2.5× their original volume while soaking in EtOAc. More EtOAc was added, as needed, until the swelling had stopped. PVC was then left to soak in EtOAc for 48 h, with occasional gentle stirring by hand. It was noticed that continuous and vigorous stirring would cause the PVC pellets to break and reform into a singular gel, complicating eventual solvent removal. EtOAc was then drained from the vessel, and the "depleted" PVC in the vessel was further washed with 2 L of EtOAc once more. The recovered EtOAc, containing PVC and small amounts of additive, was partially removed via rotary evaporation resulting in a purple-tinted oily liquid (color due to an additional unknown additive). The remaining liquid was then poured into hexanes, which resulted in an instantaneous formation of a white powder. The powdered PVC was filtered, and washed with hexanes 2-3 times, then dried under vacuum at room temperature. All solvents used were recovered and can be reused for future PVC extractions. The additive was recovered from the hexanes solutions for future use. Over numerous trials, the soluble PVC yield from this sample averaged ~8% mass recovery (ranged from 7-10%) relative to the starting mass of PVC pellets (which containing an unknown amount of additive, which is estimated to be at least 15% by mass).

Dehydrochlorination of PVC extracts: In a 1 L sealed vessel, 53 g of PVC extracts (848 mmol) were stirred in 800 mL THF for 1-2 h until fully dissolved. 13.57 g (339 mmol) of freshly ground NaOH (40 mol %) was then added to the vessel. The reaction was then sealed and left to stir at room temperature for 24 h. The reaction media was observed to change color almost instantaneously and continued darkening. After this, THF was partially removed via rotary evaporation, and the reaction contents poured into brine (i.e., saturated aq. NaCl) and left for 16 h. The solids were filtered and washed with DI water and MeOH. An orange powder was recovered and subsequently dried in a vacuum oven at 45° C. The product [DHPVC40] yield was 49.16 g. The reaction conditions discussed here can be considered relatively "mild" (Table 2).

TABLE 2

Conditions of "mild" and "harsh" dehydrochlorination reactions.

| Reaction Type | Solvent | NaOH mol % | Time | Temperature |
|---|---|---|---|---|
| Mild | THF | 40 | 24 | RT |
| Harsh | THF | 60 | 48 | RT |

Hydrogenation of DHPVC40: In a 1 L sealed vessel, 44 g of DHPVC40 and 800 mL anhydrous EtOAc were added. The air in the vessel was then evacuated and the vessel charged with $H_2$ gas at 60 psi. The contents of the vessel stirred at 60° C. for 4-6 h. Once dissolved, the vessel was opened and 0.22 g (0.5 wt %) of Wilkinson's catalyst was added to the reaction. The reaction was then left to run for 48 h, after which, another 0.5 wt % Wilkinson's catalyst was added and left to run an additional 24 h. A change in color was observed during the reaction (from dark red/brown to orange/yellow). The reaction was then stopped, EtOAc was partially via rotary evaporation, and the contents were precipitated in MeOH and left to stand for 16 h. The solids were then filtered and washed with MeOH. The powder recovered, now white in color, was dried in a vacuum oven at 45° C. The product [$H_2$-DHPVC40] yield was 39.81 g.

Solvent fractionation of PVC: Numerous trials were conducted to test the fractionation of PVC using both acetone and EtOAc. Due to the swelling of PVC in both solvents, it was determined that an initial soaking in hexanes would help reduce the swelling by selectively removing plasticizer first, thus reducing the vessel size. It was noticed that a reduction in swelling volume by 10-20% if the pellets were soaked in hexanes prior to the extraction. Extractions were performed at large scales in a 12 L Chemglass reactor, and successfully recovered ~7-8 wt % of the initial mass of PVC pellets. The PVC pellets used had a significant amount of additive in them, 20-40 wt %. Further, the limitation in available lab equipment caused a lot of loss during large scale extraction. On the contrary, at smaller scales (100 g), the yield averaged between 8-10 wt %. Using "virgin" PVC (Sigma-Aldrich product #81388), the yield of this process was in the range of 10-15 wt %.

Limits and alternatives: To show the reason behind the choice of mild (40 mol % NaOH) dehydrochlorination cycles and the choice of Wilkinson's catalyst for hydrogenation, an experiment was also run with "harsh" (60 mol % NaOH) dehydrochlorination. These experiments were also run at large scales (Table 3). From the experiment, relative insolubility of DHPVC60 in EtOAc was noticed. This was a cause for concern as that may hamper the catalyst activity. The reaction was run at 60° C. for 96 h. Following the reaction, another 60% dehydrochlorination-hydrogenation cycle was run. The first cycle of the reaction showed remarkable success, as evidenced by color (see UV-Vis spectra, FIG. **6*f*) and IR spectra. Nonetheless, signs of oxidation (during dehydrochlorination) were observed (C═O peak around 1740 $cm^{-1}$). The second cycle dehydrochlorination product (DHPVC60-2) was insoluble, possibly due to crosslinking. Results of the second cycle hydrogenation showed only partial success which is likely due to the insolubility of its subsequent DHPVC60-2, but major success in turning the polymer into a PE-like product (still insoluble). This was evident by the backbone $CH_2$ stretching and bending peaks between 2800-3050 $cm^{-1}$ and 1400-1500 $cm^{-1}$ respectively (FIGS. 6*d*-6*e***), and the stretching peaks relative intensity, and area under the curve (Table 6) compared to the C—Cl peak around 610 $cm^{-1}$. However, based on the IR broad C═C peak near 1600 $cm^{-1}$, the reaction did not go proceed to high levels putting the polymer at risk of oxidation (C═O IR peak around 1730 $cm^{-1}$). Regardless, this product showed distinct results in DSC. The polymer also was found to be malleable when heated (<100° C.). However, it quickly became brittle again upon cooling. These experiments showed enough success to warrant further investigation into 60% dehydrochlorination-hydrogenation cycles in the future.

TABLE 3

Product yields for the 1st and 2nd cycle of 60% dehydrochlorination-hydrogenation experiments.

| Product | Starting (g) | Recovered (g) [a] |
|---|---|---|
| 1st cycle 60% dehydrochlorination [DHPVC60] | 108 | 88 |
| 1st cycle 60% hydrogenation [$H_2$-DHPVC60] | 78 | 75 |
| 2nd cycle 60% dehydrochlorination [DHPVC60-2] | 66 | 56 |
| 2nd cycle 60% hydrogenation [$H_2$-DHPVC60-2] | 46 | 44 |

[a] Loss of weight is largely due to product lost during processing, loss of Cl, or loss of additive during 1st cycle.

As an alternative Wilkinson's catalyst as the hydrogenation catalyst, Pd/C as a catalyst and THF as a solvent were used to hydrogenate DHPVC60-1. The reaction was run at room temperature for 48 h. The IR spectrum (FIG. 7) shows that the results of this method are similar to those achieved using EtOAc and Wilkinson's catalyst. However, only ~0.48 g soluble product was recovered from the initial 1.00 g DHPVC60-1.

Figure 7:
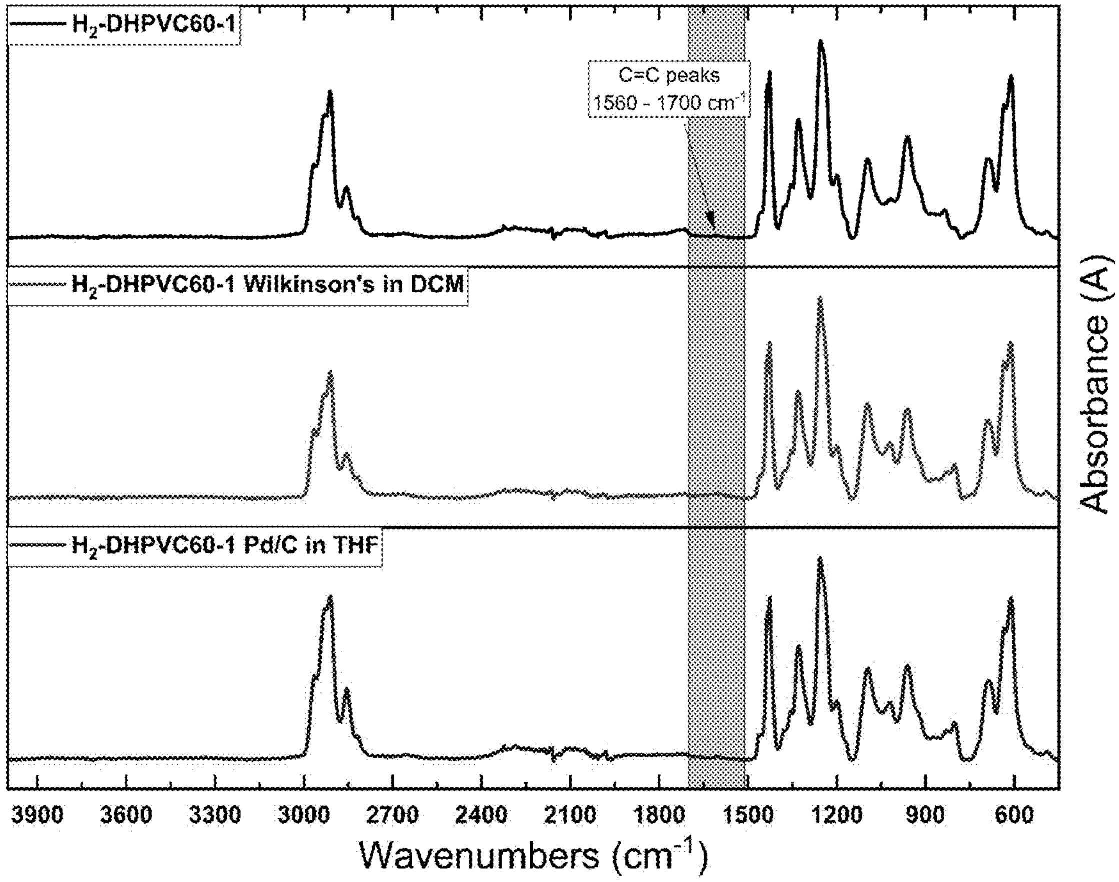
FIG. 7 depicts FTIR spectra of 1st cycle hydrogenated PVC with Wilkinson's catalyst in ethyl acetate [$H_2$-DHPVC60], 1st cycle hydrogenated PVC with Pd/C in THF [$H_2$-DHPVC60 Pd/C in THF], and 1st cycle hydrogenated PVC with Wilkinson's catalyst in DCM [$H_2$-DHPVC60 Wilkinson's in DCM].

DCM was also studied as an alternative solvent. Generally speaking, DCM is a "better" solvent for Wilkinson's and for DHPVC. Nonetheless, the results were similar those achieved using EtOAc as well (FIG. 7). In the long term, the use of DCM may not be feasible due to regulations, so one may choose to avoid DCM now to avoid potential future limitations. The viability of EtOAc is in this process is especially encouraging.

Cyclical approach: To avoid insolubility and degradation of products (due to oxidation and/or crosslinking), a cyclical approach was adopted. Towards this goal, PVC extracts were subjected to up to three cycles of dehydrochlorination and hydrogenation. As shown in S4, the Wilkinson's catalyst may struggle with insolubility and a high degree of conjugation. The cyclical approach adopted here ensures that only a small number of double bonds are formed during any single dehydrochlorination step. The dehydrochlorination reaction was limited to 40 mol % NaOH and left for only 24 h before processing. Although this meant fewer C═C bonds, it enhanced the performance of the Wilkinson's catalyst, and prevented significant degradation of the products. Careful processing prevented major loss of product (Table 4). The resulting 3rd cycle product still showed similar properties to $H_2$-DHPVC60-1, with no visible oxidation.

TABLE 4

Product yields for the 1st and 2nd cycle of 40% dehydrochlorination-hydrogenation experiments.

| Product | Starting (g) | Recovered (g) [a] |
|---|---|---|
| 1st cycle 40% dehydrochlorination [DHPVC40] | 53 | 49.16 |
| 1st cycle 40% hydrogenation [$H_2$-DHPVC40] | 44 | 39.81 |
| 2nd cycle 40% dehydrochlorination [DHPVC40-2] | 36.5 | 34.59 |
| 2nd cycle 40% hydrogenation [$H_2$-DHPVC40-2] | 31 | 30.59 |
| 3rd cycle 40% dehydrochlorination [DHPVC40-3] | 27 | 25.91 |
| 3rd cycle 40% hydrogenation [$H_2$-DHPVC40-3] | 23 | 22.23 |

[a] Loss of weight is largely due to product lost during processing, loss of Cl, or loss of additive during 1st cycle.

Results: The major benefits that could be achieved by upcycling PVC in a straightforward and accessible manner through the use of homogenous catalysts inspired a search for ways to enhance the solubility of PVC via substitution reactions, such as methods reported by Mekki and Belbachir [23]. Nonetheless, enhancement of solubility by chemical reactions proved more challenging due to the competing elimination reactions.

Instead, PVC solubility was approached by more deeply examining the PVC solubility in common, incompatible, solvents such as acetone and EtOAc. While screening solvents for PVC dissolution, it was noticed that a portion of PVC is readily soluble in these solvents (S3). It was considered that such soluble fractions of PVC might also be much better candidates to maintain solubility in organic solvents when undergoing dehydrochlorination and/or substitution reactions, allowing for homogenous catalysis under mild conditions to be used as a tool for upcycling.

Scheme 4: (a) Dehydrochlorination reaction of PVC. (b) Hydrogenation reaction of PVC.

(a)

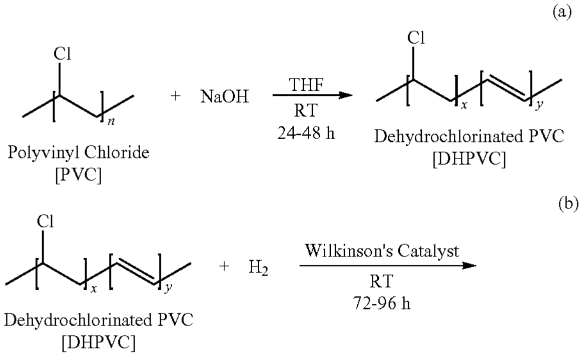

Polyvinyl Chloride [PVC]

Dehydrochlorinated PVC [DHPVC]

(b)

Dehydrochlorinated PVC [DHPVC]

-continued

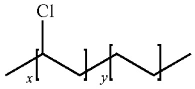

Hydrogenated Dehydrochlorinated PVC [$H_2$-DHPVC]

Figures 6A, 6B, 6C, 6D, 6E, 6F:
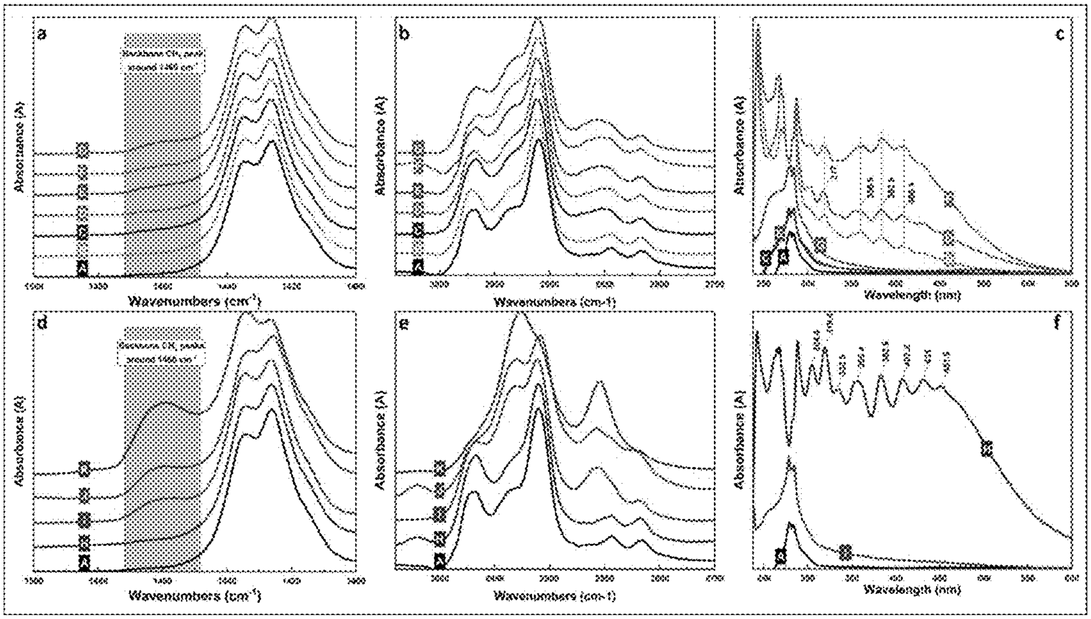
FIGS. 6*a*-6*f* depict FTIR and UV-Vis spectra.

With the aim of PVC modification through partial dechlorination of PVC in mind, both "mild" and "harsh" (Table 2) dehydrochlorination reactions (Scheme 4) were run. The product of the reactions (DHPVC40-1 for mild, DHPVC60-1 for harsh) showed the formation of conjugated C═C bonds ("polyene" segments) in the backbone of the polymer, evident by the change in color [e.g., beta carotene] and the conjugation peaks in UV-Vis spectroscopy (FIG. 6*c*, FIG. 6*f*). The UV-Vis spectra showed that DHPVC40-1 had an average polyene length around 8 double bonds [24], and DHPVC60-1 had an average polyene length of around 11 double bonds (Table 5). In FTIR, DHPVC40-1 showed little change in the range of C═C peaks (i.e., around 1600-1700 $cm^{-1}$). However, C═C peaks are clearly visible in DHPVC60-1. This is expected, as the "mild" conditions are meant to introduce a smaller number of double bonds (difficult to detect in IR due to their symmetry) which were observed to be able avoid oxidation and crosslinking.

TABLE 5

Computational UV data for conjugated double bonds.

| No. of Double Bonds | Wavelength [nm] |
|---|---|
| 1 | 152 |
| 2 | 212 |
| 3 | 259 |
| 4 | 298 |
| 5 | 333 |
| 6 | 362 |
| 7 | 387 |
| 8 | 408 |
| 9 | 426 |
| 10 | 442 |
| 11 | 455 |
| 12 | 467 |
| 13 | 477 |
| 14 | 485 |
| 15 | 493 |
| 16 | 499 |
| 17 | 505 |
| 18 | 510 |
| 19 | 515 |
| 20 | 519 |

The DHPVC products had reduced solubility in low-boiling solvents DCM, THF, EtOAc, and acetone at room temperature, but become more soluble just above ambient temperature (45-65° C.). The relative reduction in solubility can be attributed to the increase in conjugation and more rigid polymer backbone structures [25]. The reduction in solubility limits the degree of dehydrochlorination that can be achieved to maintain a soluble polymer (while also limiting oxidation/crosslinking) but also presents opportunities for sequential reactions with a high degree of tailoring dehydrochlorinations and encouraged adoption of a cyclical approach for this process (S5).

The hydrogenation reaction on DHPVC is run as soon as possible to avoid oxidation of the C═C bonds. The inherent solubility of the source PVC allows for homogenous hydrogenation using with Wilkinson's catalyst in EtOAc (Scheme 4). An obvious change in color can be seen during the reaction, which is indicative of the loss of conjugation in the polyene segments (*note that Wilkinson's catalyst is naturally an orange color in EtOAc, thus there is residual color post-hydrogenation).

The structural changes are evident in UV-Vis spectra, as no conjugation can be seen for $H_2$-DHPVC samples (FIG. 6*c*, FIG. 6*f*). In IR spectra, changes can be seen in the backbone $CH_2$ peaks around 1400-1600 $cm^{-1}$ (bending) and 2800-3000 $cm^{-1}$ (stretching), with a change in relative intensity compared to the C—Cl peak at 615 $cm^{-1}$ (Table 6), and shape (FIGS. 6*a*-6*b*, FIG. 6*d*, FIG. 6*f*) to peaks that would be associated with aliphatic hydrocarbons (i.e., segments of the backbone have become similar to PE [26]). It is worth noting that changes in the FTIR spectrum are minimal at first for $H_2$-DHPVC40 but is increasing with each cycle. In contrast, significant change is observed for $H_2$-DHPVC60 from the first cycle, and change is accentuated further in the second cycle. In addition to stark changes in color (from orange back to nearly colorless), the major outcome of the hydrogenation is that the product ("$H_2$-DHPVC") exhibits enhanced solubility in EtOAc, DCM, and THF compared to the DHPVC input. Such changes were also observed for subsequent dehydrochlorination/hydrogenation cycles on the same polymer chains (excepting DHPVC60-2 and $H_2$-DHPVC60-2). Gain of PE-like properties while attaining solubility can have major impact.

TABLE 6

Integration data for —$CH_2$— peaks (2750 $cm^{-1}$-3040 $cm^{-1}$), C—Cl peak (550 $cm^{-1}$-640 $cm^{-1}$), the ratio between them (raw and normalized).

| Sample | Area of $CH_2$ peaks (2750 $cm^{-1}$-3040 $cm^{-1}$) | Area of C—Cl peak (550 $cm^{-1}$-640 $cm^{-1}$) | Ratio of peak areas ($CH_2$/C-Cl) | Normalized Ratio of Area |
|---|---|---|---|---|
| PVC Extracts | −0.32348 | −0.46861 | 0.690296835 | 1 |
| DHPVC40-1 | −0.35607 | −0.54646 | 0.651593895 | 0.943933 |
| HDHPVC40-1 | −0.52054 | −0.60898 | 0.854773556 | 1.23827 |
| DHPVC40-2 | −0.37756 | −0.4867 | 0.775755085 | 1.123799 |
| HDHPVC40-2 | −0.41556 | −0.46763 | 0.888651284 | 1.287347 |
| DHPVC40-3 | −0.31694 | −0.34326 | 0.923323428 | 1.337574 |
| HDHPVC40-3 | −0.69564 | −0.62367 | 1.115397566 | 1.615823 |
| DHPVC60-1 | −0.53642 | −0.6109 | 0.878081519 | 1.272035 |
| HDHPVC60-1 | −0.61328 | −0.43241 | 1.418283573 | 2.0546 |
| DHPVC60-2 | −0.47607 | −0.25934 | 1.835698311 | 2.659288 |
| HDHPVC60-2 | −1.87149 | −0.49688 | 3.766482853 | 5.456324 |

Figures 8A, 8B:
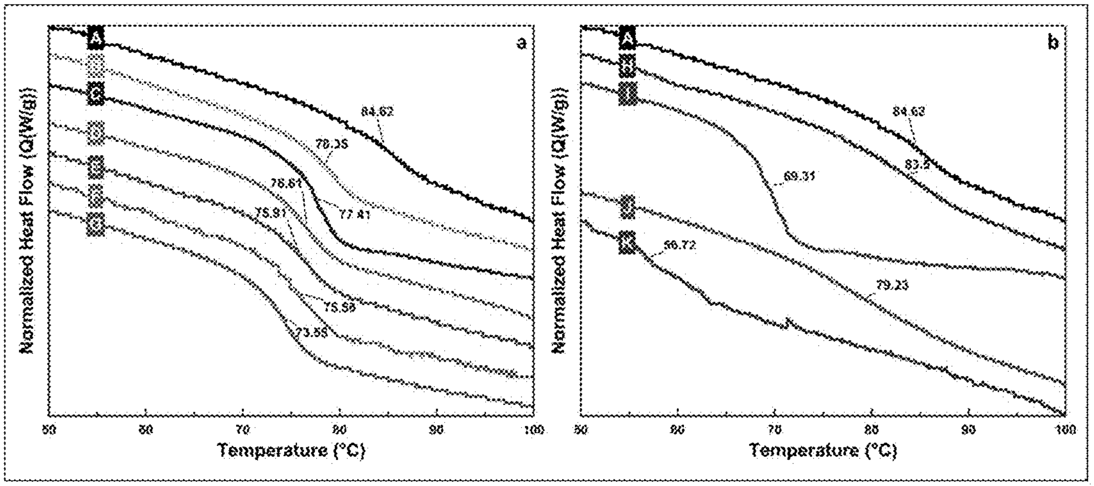
FIGS. 8*a*-8*b* depict DSC scans for DHPVC40 series (FIG. 8*a*) and DHPVC60 series (FIG. 8*b*). Legend: (—A) PVC Extracts, (—B) DHPVC40-1, (—C) $H_2$-DHPVC40-1, (—D) DHPVC40-2, (—E) $H_2$-DHPVC40-2, (—F) DHPVC40-3, (—G) $H_2$-DHPVC40-3, (—H) DHPVC60-1, (—I) $H_2$-DHPVC60-1, (—J) DHPVC60-2, (—K) $H_2$-DHPVC60-2.

A decrease in glass transition temperature ($T_g$) is observed post-hydrogenation in all cases (FIGS. 8*a*-8*b*). This is attributed to the formation of PE-like sequences in the backbone of the polymer. The $T_g$ in DHPVC remains relatively unchanged from its preceding $H_2$-DHPVC, but higher than its subsequent $H_2$-DHPVC product, with relatively large differences in some cases (e.g., DHPVC60-1). This discrepancy in the $T_g$ of DHPVC and its product can be attributed to the increased hindrance in the conjugated polymer alongside the increase in bond strength and length in the polymer backbone.

Amongst the experiments done here, DHPVC60-2 and its hydrogenation illustrated the limits of this process, but also the possibilities. Both 2nd cycle DHPVC60 products were insoluble, however, the hydrogenation product was even more PE-like. Other alternative methods were also tested on DHPVC60-1 (FIG. 7) but showed no major differences in the results discussed here, encouragingly confirming that a green solvent (EtOAc) in combination with a relatively safe and stable catalyst (Wilkinson's) can be applied to PVC upcycling.

Figures 9A, 9B, 9C:
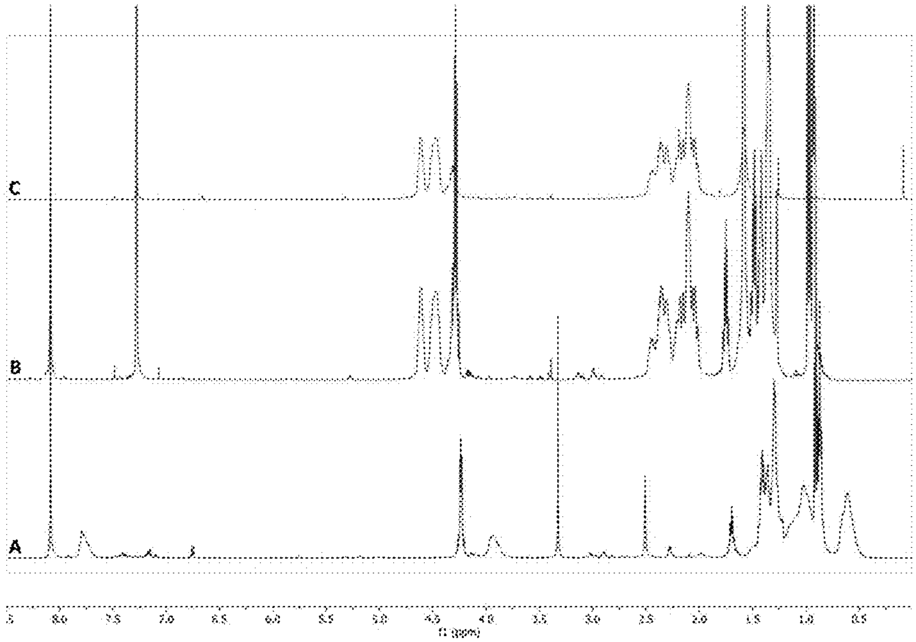
FIGS. 9*a*-9*c* depict a stacked $^1H$ NMR spectra of PVC additive mixture (FIG. 9*a*) PVC pellets (FIG. 9*b*) and extracted PVC pellets (FIG. 9*c*).

To emphasize the viability of this process, reactions were run in a relatively large scales, starting from a commercial PVC product containing a dialkyl-terephthalate plasticizer (FIGS. 9*a*-9*c*). While nearly all the plasticizer was removed during initial the extraction process, the resultant soluble PVC fraction still contained some plasticizer, as can be seen by the FTIR C═O peaks around 1740 $cm^{-1}$. Given that terephthalates are diesters (which are cleaved by strong bases such as KOH to the diacid salt and requisite alcohols) the presence of plasticizer is not an issue for the process in this work, as the first dehydrochlorination step simultaneously decomposes residual plasticizer while forming the first DHPVC product, evident by the lack of C═O peak around 1740 $cm^{-1}$. From that point on, the material used in subsequent steps can be considered additive-free, which removes a potential source of catalyst poisoning. The initial extraction of soluble PVC was done at a relatively large scale of ~5 kg plasticized PVC (recovering ~420 g of soluble PVC), and each of the following reactions were run at scales up to 100 g. Working exclusively with more soluble fractions of PVC can enable a more rapid scale-up of PVC upcycling to a CPE-like product (and future depolymerization) rather than working with "bulk" PVC where reactions to date have been limited to milligram to gram scales because of limited solubility.

The volume of research into PVC upcycling is minimal compared to other well-known, but not necessarily as common, plastics. While PVC upcycling is challenged by uncontrolled reactions that result from dehydrochlorination, the C═C bonds produced are also ideal sites for modification. In this work, it was shown that the C═C bonds in dehydrochlorinated PVC are amenable to "repair" via hydrogenation under mild conditions using a green solvent and stable catalyst. The resultant $H_2$-DHPVC product showed structural changes in the alkane regions in IR, as well as a reduction in Tg, while still being soluble. $H_2$-DHPVC products may find use as a modifier/compatibilizer for polymer blends and a potential replacement for CPE. These methods could further be expanded to different hydrofunctionalization reagents with Wilkinson's catalyst. The solubility of the DHPVC and $H_2$-DHPVC products are also expected to facilitate olefin metathesis reactions to for depolymerization into dienes.

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus, a combination of steps, elements, components, or constituents can be explicitly mentioned herein;

however, all other combinations of steps, elements, components, and constituents are included, even though not explicitly stated.

What is claimed is:

1. A method of partially dehydrochlorinating polyvinyl chloride (PVC), comprising: contacting the PVC with a first organic solvent to form a PVC extract comprising dissolved PVC and the first organic solvent; at least partially removing the first organic solvent from the PVC extract; and contacting the PVC extract with a second organic solvent and a base, thereby providing a partially dehydrochlorinated PVC.

2. The method of claim 1, wherein the PVC extract further comprises non-dissolved PVC, and wherein the method further comprises removing said non-dissolved PVC from the PVC extract.

3. The method of claim 1, wherein the partially dehydrochlorinated PVC is precipitated by adding a non-solvent, and a precipitate is isolated.

4. The method of claim 1, wherein the first organic solvent is ethyl acetate, acetone, methyl acetate, or mixtures thereof.

5. The method of claim 1, wherein the second organic solvent is tetrahydrofuran, dimethylformamide, dichloromethane, dimethylacetamide, chloroform, N-methylpyrrolidine, dimethylsulfoxide, or mixtures thereof.

6. The method of claim 1, wherein the base is potassium hydroxide or sodium hydroxide.

7. The method of claim 3, wherein the non-solvent is water, methanol, alkanes, or mixtures thereof.

8. The method of claim 1, wherein the partially dehydrochlorinated PVC is from about 10% to about 95% dehydrochlorinated PVC.

9. The method of claim 1, wherein the partially dehydrochlorinated PVC has the structure

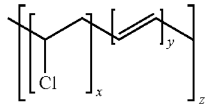

wherein x is from 1 to 1,000,000, y is from 1 to 1,000,000, and z is from 2 to 1,000,000.

10. The method of claim 1, further comprising partially hydrofunctionalizing the partially dehydrochlorinated PVC by contacting the partially dehydrochlorinated PVC with a hydrofunctionalization catalyst and a hydrofunctionalizing agent, thereby providing a partially hydrofunctionalized, dehydrochlorinated PVC.

11. The method of claim 10, wherein the hydrofunctionalization catalyst is a palladium catalyst, Raney nickel catalyst, Raney cobalt, lithium aluminum hydride, diisobutylaluminum hydride, sodium borohydride, or Wilkinson's Catalyst.

12. The method of claim 10, wherein the partially dehydrochlorinated PVC is dissolved in a solvent and contacted with the hydrofunctionalization catalyst.

13. The method of claim 10, wherein the partially dehydrochlorinated PVC is contacted with the hydrofunctionalization catalyst in a non-solvent.

14. The method of claim 10, wherein the partially hydrofunctionalized, dehydrochlorinated PVC is from about 10% to about 99% hydrofunctionalized.

15. The method of claim 10, further comprising contacting the partially hydrofunctionalized, dehydrochlorinated PVC with sulfur.

16. The method of claim 10, wherein the partially hydrofunctionalized, dehydrochlorinated PVC has the structure

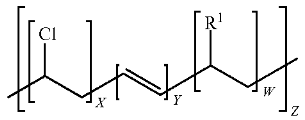

wherein:

x is from 1 to 100,000;

y is from 0 to 100,000;

w is from 1 to 100,000;

z is from 2 to 100,000;

$R^1$ is hydrogen, halo, $R^2C(=O)$, Si, $NR^2R^3$, $OR^2$, or $C(=O)$; and $R^2$ and $R^3$ are independently selected at each occurrence from hydrogen, $C_{1-6}$ alkyl, $C_{2-6}$ alkenyl, and $C_{2-6}$ alkynyl.

17. The method of claim 10, further comprising contacting the partially hydrofunctionalized, dehydrochlorinated PVC with a nucleophile substituted diene in the presence of a mild base, to provide a diene substituted partially hydrofunctionalized, dehydrochlorinated PVC; and contacting the diene substituted partially hydrofunctionalized, dehydrochlorinated PVC with a bis-dienophile.

18. The method of claim 17, wherein the bis-dienophile comprises two dienophiles linked via a linker having from 2 to 2000 atoms.

19. The method of claim 10, further comprising dehydrochlorinating the partially hydrofunctionalized, dehydrochlorinated PVC by dissolving the partially hydrofunctionalized, dehydrochlorinated PVC in a third organic solvent and adding a second base.

20. The method of claim 19, wherein the third organic solvent is tetrahydrofuran, dimethylformamide, dichloromethane, dimethylacetamide, chloroform, N-methylpyrrolidine, dimethylsulfoxide, or mixtures thereof.

21. The method of claim 16, wherein the second base is potassium hydroxide or sodium hydroxide.

22. The method of claim 1, wherein the temperature is below 200° C.

23. The method of claim 1, further comprising depolymerizing the partially dehydrochlorinated PVC by contacting the partially depolymerized PVC with a metathesis catalyst and dissolved olefin (gas or liquid).

* * * * *